United States Patent
Hojo et al.

(10) Patent No.: US 8,614,019 B2
(45) Date of Patent: Dec. 24, 2013

(54) ELECTRICITY STORAGE DEVICE

(75) Inventors: Nobuhiko Hojo, Osaka (JP); Yu Ohtsuka, Osaka (JP); Shoichiro Watanabe, Nara (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 932 days.

(21) Appl. No.: 12/466,112

(22) Filed: May 14, 2009

(65) Prior Publication Data
US 2009/0246631 A1 Oct. 1, 2009

Related U.S. Application Data

(63) Continuation of application No. PCT/JP2007/072027, filed on Nov. 13, 2007.

(30) Foreign Application Priority Data

| Nov. 16, 2006 | (JP) | 2006-310003 |
| Feb. 6, 2007 | (JP) | 2007-026245 |
| Feb. 23, 2007 | (JP) | 2007-043154 |
| Mar. 15, 2007 | (JP) | 2007-066385 |
| May 8, 2007 | (JP) | 2007-123275 |

(51) Int. Cl.
*H01M 4/13* (2010.01)
(52) U.S. Cl.
USPC .................. 429/231.95; 429/218.1
(58) Field of Classification Search
USPC .......................... 429/231.95, 218.1
See application file for complete search history.

(56) References Cited

U.S. PATENT DOCUMENTS 6,558,848 B1 * 5/2003 Kobayashi et al. ........... 429/241
6,685,804 B1 2/2004 Ikeda et al.
(Continued)

FOREIGN PATENT DOCUMENTS

CN 1382310 11/2002
CN 1645664 7/2005
(Continued)

OTHER PUBLICATIONS

European Search Report issued in European Patent Application No. 07831757.5-1227, mailed Oct. 22, 2009.
(Continued)

*Primary Examiner* — Helen O Conley
(74) *Attorney, Agent, or Firm* — McDermott Will & Emery LLP

(57) ABSTRACT

Disclosed is an electricity storage device which can be charged/discharged at high rate and have high output, high capacity and excellent repeating charge/discharge characteristics, although it uses a non-carbon material as a negative electrode active material. Specifically disclosed is an electricity storage device comprising: a positive electrode collector; a positive electrode disposed on the positive electrode collector and including a positive electrode active material which can reversibly absorb/desorb at least anions; a negative electrode collector; and a negative electrode disposed on the negative electrode collector and including a negative electrode active material which can substantially absorb/desorb lithium ions reversibly. The negative electrode active material is composed of at least one substance selected from the group consisting of silicon, a silicon-containing alloy, a silicon compound, tin, a tin-containing alloy, and a tin compound; and the negative electrode is formed as a thin film having a thickness of 10 μm or less.

23 Claims, 10 Drawing Sheets

(56) References Cited

U.S. PATENT DOCUMENTS

| | | |
|---|---|---|
| 6,887,511 B1 | 5/2005 | Shima et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,410,728 B1 | 8/2008 | Fujimoto et al. |
| 7,794,881 B1 | 9/2010 | Fujimoto et al. |
| 2005/0100790 A1 | 5/2005 | Ota et al. |
| 2005/0170247 A1* | 8/2005 | Nakahara et al. ............ 429/213 |
| 2005/0214646 A1 | 9/2005 | Kubota |
| 2006/0093894 A1* | 5/2006 | Scott et al. ................. 429/50 |
| 2006/0222944 A1 | 10/2006 | Yamamoto et al. |
| 2007/0182418 A1* | 8/2007 | Reynier et al. ............. 324/429 |
| 2007/0224502 A1* | 9/2007 | Affinito et al. ............. 429/209 |
| 2009/0023066 A1 | 1/2009 | Kojima et al. |
| 2010/0194347 A1 | 8/2010 | Kubota |

FOREIGN PATENT DOCUMENTS

| | | |
|---|---|---|
| CN | 1841833 | 10/2006 |
| EP | 1 612 819 A2 | 3/2004 |
| JP | 2000-040528 | 2/2000 |
| JP | 2000-195555 | 7/2000 |
| JP | 2001-085016 | 3/2001 |
| JP | 2001-110418 | 4/2001 |
| JP | 2001-148242 | 5/2001 |
| JP | 2002-025551 | 1/2002 |
| JP | 2002-157995 | 5/2002 |
| JP | 2002-237294 | 8/2002 |
| JP | 2002-260634 | 9/2002 |
| JP | 2004-111374 | 4/2004 |
| JP | 2004-178828 | 6/2004 |
| JP | 2004-193004 | 7/2004 |
| JP | 2004-342605 | 12/2004 |
| JP | 2005-038612 | 2/2005 |
| JP | 2005-085633 | 3/2005 |
| JP | 2005-093777 | 4/2005 |
| JP | 2005-190695 | 7/2005 |
| JP | 2005-259726 | 9/2005 |
| JP | 2006-100262 | 4/2006 |
| JP | 2006-185858 | 7/2006 |
| JP | 2006-244984 | 9/2006 |
| JP | 2006-286923 | 10/2006 |
| JP | 2007-299801 | 11/2007 |
| WO | WO 03/003395 A1 | 1/2003 |
| WO | WO 2006/118120 A1 | 11/2006 |

OTHER PUBLICATIONS

Chinese Office Action issued in Chinese Patent Application No. 200780042484.4, mailed Oct. 28, 2010.

Japanese Office Action issued in Japanese Patent Application No. 2008-525294, dated Sep. 18, 2008.

Japanese Office Action issued in Japanese Patent Application No. 2008-525294, dated Jan. 29, 2009.

* cited by examiner

ELECTRICITY STORAGE DEVICE

RELATED APPLICATIONS

This is a continuation of International Application No. PCT/JP2007/072027, with an international filing date of Nov. 13, 2007, which claims priority of Japanese Patent Application Nos. 2006-310003, filed on Nov. 16, 2006, 2007-026245, filed on Feb. 6, 2007, 2007-043154, filed on Feb. 23, 2007, 2007-066385, filed on Mar. 15, 2007, and 2007-123275, filed on May 8, 2007, the contents of which are hereby incorporated by reference.

TECHNICAL FIELD

The present invention relates to an electricity storage device that has high output, high capacity, and excellent repeated charge and discharge (hereinafter referred to as charge/discharge) life characteristics.

BACKGROUND ART

Conventionally, electricity storage devices capable of being charged/discharged are used as: a power supply for hybrid cars powered by using two types of energy being gasoline and electricity, and for various electronic equipments, particularly for mobile communications equipments, portable electronic equipments, and the like; an uninterruptible power supply; and the like. With the recent dissemination of hybrid cars and electronic devices, demand for enabling higher performance in electricity storage devices is becoming extremely high. In response to this demand, research and development related to electric double layer capacitors, which is one type of electricity storage device, are being actively pursued. Electric double layer capacitors have features of high output and excellent repeated charge/discharge life characteristics, and application mainly for use due to high output is being highly anticipated. However, electric double layer capacitors have a lower capacity, that is, a lower energy density, when compared to secondary batteries.

For enabling higher capacity in electric double layer capacitors, for example, a positive electrode active material of an electric double layer capacitor and a negative electrode active material of a lithium-ion battery are selected, and then, various studies are made regarding: optimization performed separately for a positive electrode active material and a negative electrode active material; optimization performed for the positive and negative electrode active materials as a combination; and the like. For the negative electrode active material, for example, carbon materials such as graphite, polyacene, and the like in a crystalline or an amorphous state are being considered. These carbon materials are materials that can reversibly absorb and desorb (hereinafter referred to as absorb/desorb) lithium ions by charging/discharging. A large number of proposals are being made regarding: a method for producing these carbon materials; an electricity storage device having a positive electrode active material of an electric double layer capacitor such as an activated carbon and a negative electrode containing these carbon materials, combined together; and the like (for example, refer to Patent Documents 1 and 2).

In addition, attempts are being made to enable high capacity in electricity storage devices by using a negative electrode active material that has a higher capacity density than a carbon material. For this kind of negative electrode active material: a negative electrode active material resulting from reforming a carbon material; a negative electrode active material other than a carbon material; and the like can be given. For the negative electrode active material resulting from reforming a carbon material: "negative electrode active materials in which optically-anisotropic carbonaceous material other than graphite is subjected to activation; and negative electrode active materials whose surfaces have been partially or entirely covered with a carbon material and/or a silicon material" are proposed (for example, refer to Patent Document 2). For the negative electrode active material other than a carbon material, metal oxides such as a tin oxide, a silicon oxide, and the like are proposed (for example, refer to Patent Documents 3 and 4).

Patent Documents 2 to 4 disclose the combination of: a negative electrode active material disclosed in each of the patent documents; and a positive electrode active material which is an activated carbon. In particular, Patent Documents 3 and 4 disclose that an electricity storage device having excellent over-discharge characteristics can be obtained by combining: a negative electrode active material that is a non-carbon material such as a silicon oxide and a tin oxide; and a positive electrode active material that is an activated carbon. More specifically, in Example 1 of Patent Document 3, a negative electrode material mixture is prepared by mixing: silicon monoxide particles (a negative electrode active material) that has undergone grounding and granulation to have a particle size of 44 μm or less; graphite (a conductive material); and polyacrylic acid (a binder), in a weight ratio of 45:40:15, respectively. This negative electrode material mixture is pressure-molded, and thus a negative electrode pellet having a diameter of 4 mm and a thickness of 0.19 mm is fabricated. This negative electrode pellet is fixed to a negative electrode case by a conductive resin binder that also serves as a negative electrode current collector. An electricity storage device including this negative electrode pellet is capable of operating in a voltage region that includes an over-discharge region ranging from 2 V to an end-of-discharge voltage of 0 V. However, the charge/discharge rate is extremely low with a 200-hour rate (rate of 0.005 C), and thus, output characteristics are poor.

Meanwhile, lithium secondary batteries which are largely used in electronic equipments such as portable electronic devices, generally have a charge/discharge rate of about a 10-hour rate to a 0.5-hour rate (rate of 0.1 C to 2 C). Therefore, electricity storage devices of Patent Documents 3 and 4 apparently cannot be used as alternatives for a lithium secondary battery. In addition, electric double layer capacitors capable of being instantly charged/discharged at a large current generally have a charge/discharge rate of about a 0.002-hour rate to a 0.02-hour rate (rate of 500 C to 50 C). Therefore, electricity storage devices of Patent Documents 3 and 4 cannot be used as alternatives for an electric double layer capacitor as well. In this manner, electricity storage devices disclosed in Patent Documents 3 and 4 are high in voltage and capacity, but are limited in use due to a low charge/discharge rate and poor output characteristics.

In contrast, for the positive electrode active material, being considered is an organic compound that is capable of being oxidized and reduced, and has higher capacity compared to the activated carbon which is currently widely used. For the organic compound capable of being oxidized and reduced, being proposed are an organic compound having a π conjugated-electron cloud (for example, refer to Patent Documents 5 and 6), an organic compound having a radical (for example, refer to Patent Document 7), and the like. However, these Patent Documents do not report anything regarding a combination of: a positive electrode active material that is an organic compound capable of being oxidized and reduced; and a negative electrode active material that is a non-carbon material.

Patent Document 1: International Publication No. WO 2003/003395
Patent Document 2: Japanese Laid-Open Patent Publication No. 2005-093777
Patent Document 3: Japanese Laid-Open Patent Publication No. 2000-195555
Patent Document 4: Japanese Laid-Open Patent Publication No. 2001-148242
Patent Document 5: Japanese Laid-Open Patent Publication No. 2004-111374
Patent Document 6: Japanese Laid-Open Patent Publication No. 2004-342605
Patent Document 7: Japanese Laid-Open Patent Publication No. 2004-193004

DISCLOSURE OF THE INVENTION

Problem To be Solved by the Invention

Such being the case, an object of the present invention is to provide an electricity storage device capable of being charged/discharged at high rate, having high output, high capacity, and excellent repeated charge/discharge life characteristics.

Means for Solving the Problem

The present inventors keenly pursued studies in order to solve the above problem. As a result, they have found that higher charge/discharge rate and thus higher output can be achieved, by making a negative electrode have a specific constitution when combining: a positive electrode active material for an electric double-layer capacitor; and a negative electrode active material that is a non-carbon material capable of reversibly absorbing/desorbing lithium ions. That is, they have found that an electricity storage device having higher charge/discharge rate, higher output, higher capacity, and excellent repeated charge/discharge life characteristics can be obtained, by forming a negative electrode comprising a non-carbon material directly on a negative electrode current collector without the use of a binder.

That is, an electricity storage device of the present invention comprises: a positive electrode current collector; a positive electrode disposed on the positive electrode current collector, including a positive electrode active material capable of reversibly absorbing/desorbing at least anions; a negative electrode current collector; and a negative electrode disposed on the negative electrode current collector, substantially comprising a negative electrode active material capable of reversibly absorbing/desorbing lithium ions. The negative electrode active material is at least one selected from the group consisting of silicon, a silicon-containing alloy, a silicon compound, tin, a tin-containing alloy, and a tin compound, and the negative electrode is a thin film having a thickness of 10 μm or less.

The capacity per unit area of the negative electrode is preferably 0.2 to 2.0 mAh/cm$^2$.

The thickness of the positive electrode is preferably 5 or more times the thickness of the negative electrode.

The specific surface area of the negative electrode is preferably 5 or larger.

The specific surface area of the negative electrode current collector is preferably 5 or larger.

The surface roughness value Ra of the negative electrode current collector is preferably equal to or greater than the thickness of the negative electrode.

Lithium is preferably absorbed in the negative electrode active material in advance.

Absorption of lithium in the negative electrode active material is preferably mechanically performed.

During charging/discharging of the electricity storage device, SOC of the negative electrode is preferably 20% or higher and 95% or lower.

The negative electrode active material is preferably silicon.

The negative electrode active material is preferably a silicon nitride or a silicon oxynitride.

The silicon compound is preferably a silicon oxide represented by a formula SiOx (0<x<2).

The positive electrode active material is preferably an activated carbon.

The positive electrode active material is preferably an organic compound capable of being oxidized and reduced.

The organic compound preferably has a radical in the molecule thereof.

The organic compound preferably has a π-conjugated electron cloud in the molecule thereof.

The negative electrode current collector has an electrolyte retention portion whose volume is preferably not less than 30% of the volume occupied by the negative electrode current collector.

The negative electrode current collector has an electrolyte retention portion whose volume is preferably not less than 50% of the volume occupied by the negative electrode current collector.

The negative electrode current collector preferably is a porous film having a plurality of through-holes that penetrate in the thickness direction thereof.

The negative electrode current collector preferably: does not have through-holes that penetrate in the thickness direction thereof; and has a plurality of projections on the surface thereof, with the cross-section of the projection in the thickness direction thereof shaped as a trapezoid or a pseudo-trapezoid.

The height of the projection is preferably 2 or more times the thickness of the negative electrode.

A covering layer including the negative electrode active material is preferably formed on at least a part of the tip portion of the projection.

Effect of the Invention

According to the present invention, an electricity storage device capable of being charged/discharged at high rate, having high output, high capacity, and excellent repeated charge/discharge life characteristics can be provided. An electricity storage device can be provided, in which: capacity does not lower even at times of high output; and high output can be stably maintained for a long period of time.

BEST MODE FOR CARRYING OUT THE INVENTION

Figure 1:
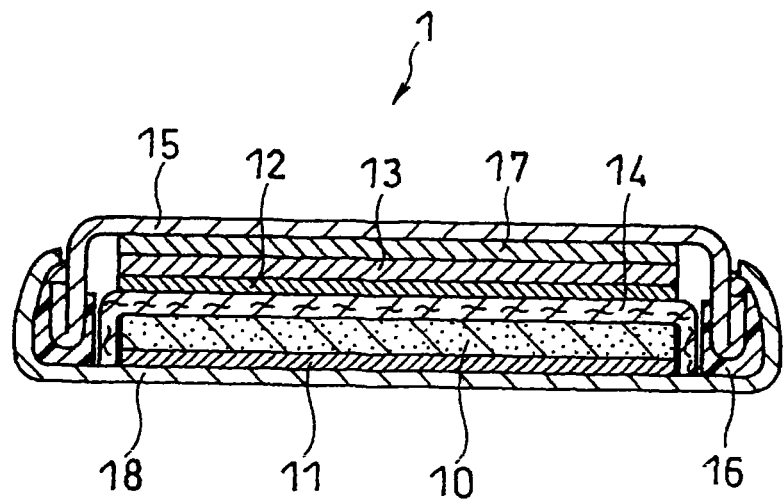
FIG. 1 is a vertical sectional view schematically showing the constitution of an electricity storage device 1 that is one embodiment of the present invention.

An electricity storage device of the present invention comprises a positive electrode, a positive electrode current collector, a negative electrode, and a negative electrode current collector, and has the following features of (a) and (b). Otherwise, constitution is the same as that of a conventional electricity storage device.

(a) The greatest feature of the present invention is that: the negative electrode does not include a binder, particularly an organic binder; and includes a non-carbon material as a negative electrode active material, capable of reversibly absorbing/desorbing lithium ions. That is, the negative electrode substantially comprises a layer of negative electrode active material. For the non-carbon material capable of reversibly absorbing/desorbing lithium ions, at least one selected from the group consisting of silicon, a silicon-containing alloy, a silicon compound, tin, a tin-containing alloy, and a tin compound is used.

In a conventional electricity storage device using a non-carbon material in particle form as a negative electrode active material, a negative electrode is composed by binding a non-carbon material particle and a conductive material with a binder. According to studies made by the present inventors, it was found that a negative electrode such as the above causes: contact resistance among active material particles; contact resistance between an active material particle and a current collector surface; contact resistance between an active material particle and a conductive material when the negative electrode contains a conductive material; and the like, and thus causes the internal resistance of the electricity storage device to increase. Due to this, it is assumed that the charge/discharge rate, and thus, the output degrade remarkably.

In addition, only when the negative electrode does not include a binder, particularly an organic binder as in the present invention, can lithium be absorbed in the negative electrode active material in advance by means of mechanical charging which involves a thin-film forming process such as vapor deposition. Due to the present invention, workability of the electricity storage device improves remarkably, since mechanical absorption of lithium into the negative electrode active material becomes possible as the above.

In the electricity storage device of the present invention, the negative electrode substantially comprises a non-carbon material. It should be noted that in the present invention, the negative electrode includes a non-carbon material as well as an inorganic compound. The inorganic compound is used for the purpose of improving the mechanical strength, and the like of the negative electrode. The inorganic compound used in combination with the non-carbon material is: an inorganic compound that does not contribute to battery reaction; and is heat-resistant to the extent of not causing degradation and the like, even if Li is absorbed in the negative electrode. For example: iron, cobalt, antimony, bismuth, lead, nickel, copper, silver, zinc, thallium, cadmium, gallium, germanium, indium, titanium, or a compound thereof; or an alloy thereof and silicon; or an alloy thereof and tin; and the like can be given. By not including a binder, the negative electrode of the present invention is formed as a structure in which a non-carbon material, which is the negative electrode active material, is continuously connected. By employing such a structure, the electrical contact resistance (hereinafter, simply "contact resistance") between the negative electrode and the negative electrode current collector can be made considerably smaller.

(b) The negative electrode comprising a thin film having a thickness of 10 μm or less is formed directly on the surface of the negative electrode current collector. In conventional technology in which a non-carbon material is used in particle form as a negative electrode active material, a negative electrode is not formed directly on a negative electrode current collector, and instead, a negative electrode fabricated separately is adhered or bonded to the negative electrode current collector. The negative electrode is, for example, fabricated by: mixing a non-carbon material particle, a conductive material, and a binder; and then pressure-molding the obtained mixture into a form of a pellet. For example, when a non-carbon material particle having a particle size of 44 μm or less is used as in Patent Documents 3 and 4, it is apparent that a negative electrode having a smooth surface and a thickness of about 30 μm can not be fabricated. The thickness of a negative electrode pellet that can be fabricated by the conventional method is, at smallest, about several tens of μm even if the non-carbon material particle is further pulverized, and for example, drastic film-thinning such as to about 10 μm would be difficult.

In contrast, in the present invention, the negative electrode thickness can be made considerably thinner than in the conventional art, by forming a negative electrode comprising a thin film with a thickness of 10 μm or less on the surface of the negative electrode current collector. The negative electrode will serve as a passage for an electron or an ion during charging/discharging. Therefore, if the negative electrode thickness is thin, transfer distance accordingly becomes short for an electron or an ion, and resistance becomes small, thereby enabling reduction of internal resistance in the electricity storage device. In addition, when forming the negative electrode directly on the negative electrode current collector surface, workability of the electricity storage device improves remarkably, since the negative electrode can be formed, for example, by means of vapor deposition and the like.

In this manner, the electricity storage device of the present invention results in having an internal resistance that is remarkably smaller compared to a conventional electricity storage device by having the above features of (a) and (b), and thus, becoming capable of being charged/discharged at high rate and achieving high output. Further, through the use of a non-carbon material as the negative electrode active material, the present invention can provide an electricity storage device having high capacity, excellent repeated charge/discharge life characteristics, and remarkably-improved workability. Also, through the use of this thin-film negative electrode, miniaturization of the electricity storage device becomes possible.

It should be noted that here, the thickness of the negative electrode is referred to as the thickness of the negative electrode at the time of electricity storage device fabrication (in a discharged state). Since the negative electrode active material reversibly absorbs/desorbs lithium during charging/discharging, the thickness of the negative electrode changes.

With respect to the negative electrode capacity per unit area, a negative electrode that exhibits a capacity of 0.2 to 2.0 mAh/cm$^2$ can be used. Preferably, the negative electrode capacity per unit area is 0.2 to 1.0 mAh/cm$^2$. It should be noted that here, a negative electrode capacity is referred to as: a capacity for a single negative electrode, capable of reversible charging/discharging, not including an irreversible capacity that will be described below; and specifically, a reversible capacity when charging/discharging is carried out at 0.2 CA (5-hour rate) for the negative electrode capacity within the potential range of 0 to 1.5 V versus lithium.

One embodiment of an electricity storage device of the present invention will be described below with reference to Figures.

Figure 2:
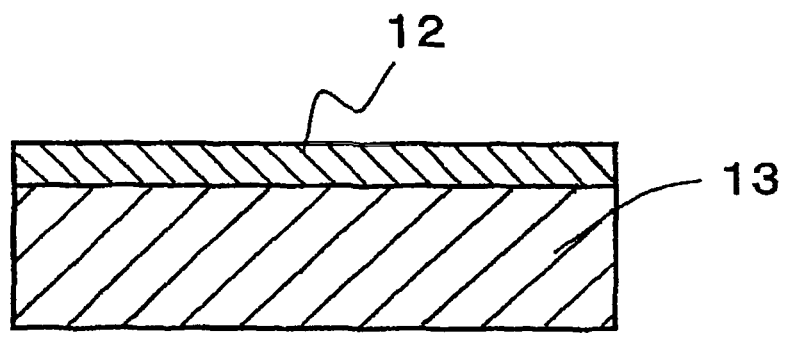
FIG. 2 is a vertical sectional view schematically showing the constitution of a negative electrode 12 formed on the surface of a negative electrode current collector 13.

FIG. 1 is a vertical sectional view schematically showing the constitution of a coin-type electricity storage device 1 which is an embodiment of the present invention. FIG. 2 is a vertical sectional view schematically showing the constitution of a negative electrode 12 formed on the surface of a negative electrode current collector 13. The electricity storage device 1 includes a positive electrode 10, a positive electrode current collector 11, the negative electrode 12, the negative electrode current collector 13, a separator 14, a sealing plate 15, a gasket 16, a spacer 17, and a case 18. The electricity storage device 1 is a coin-type electricity storage device composed in a manner in which a stacking body of the spacer 17, the negative electrode current collector 13, the negative electrode 12, the separator 14, the positive electrode 10, and the positive electrode current collector 11 is housed in an internal space created by the sealing plate 15 and the case 18. Therefore, it can also be said that FIG. 1 is view showing a cross-section in the diametrical direction, of the electricity storage device 1. It should be noted that roughly even pressure is applied to the stacking body of the positive electrode current collector 11, the positive electrode 10, the separator 14, the negative electrode 12, and the negative electrode current collector 13 in the electricity storage device 1.

The negative electrode 12 is a thin film having a thickness of 10 μm or less. Due to this, an electricity storage device capable of being charged/discharged at high rate, having high output, high capacity, and excellent repeated charge/discharge life characteristics can be obtained. The thickness of the negative electrode 12 is preferably 5 μm or less, and is more preferably 2 to 5 μm.

The negative electrode 12 comprises a negative electrode active material capable of reversibly absorbing/desorbing lithium ions, and substantially does not contain an insulating material such as a binder. Specifically, the negative electrode active material is at least one non-carbon material selected from the group consisting of silicon, a silicon-containing alloy, a silicon compound, tin, a tin-containing alloy, and a tin compound. Among these, silicon is preferable as the negative electrode active material, due to being particularly high in capacity and able to easily thin the negative electrode thickness to be 5 μm or less.

For the silicon-containing alloy, for example: an alloy composed of silicon and at least one element selected from the group consisting of iron, cobalt, antimony, bismuth, lead, nickel, copper, zinc, germanium, indium, tin, and titanium; and the like. can be given. For the silicon compound, there is no particular limitation as long as the compound contains silicon other than that of the silicon-containing alloy, but a silicon oxide material, a silicon nitride, a silicon oxynitride, and the like are preferable.

For the silicon oxide, for example, silicon oxide represented by a formula SiOx ($0<x<2$) can be given. This silicon oxide may contain elements such as nitrogen and sulfur. For the silicon nitride, for example, silicon nitride represented by a formula $Si_3N_y$ ($3<y\leq4$) can be given, of which $Si_3N_4$ is preferable. For the silicon oxynitride, a compound that: contains silicon, oxygen, and nitrogen as main components; and at some times contains elements other than the above three elements (for example, carbon, hydrogen, and the like) as impurities, can be used. For example, a compositional formula $SiO_aN_b$ where a/b is about 0.2 to 5.0 can be preferably used. For the tin-containing alloy, for example: an alloy composed of tin and at least one element selected from the group consisting of iron, cobalt, antimony, bismuth, lead, nickel, copper, silver, zinc, thallium, cadmium, gallium, germanium, indium, and silicon; and the like can be given. For the tin compound, there is no particular limitation as long as the compound contains tin other than that of the tin-containing alloy, but a tin oxide is preferable. For the tin oxide, for example, tin oxide represented by a formula SnOx (x is the same as the above) can be given. This tin oxide may contain an element such as nitrogen, sulfur, and the like.

These non-carbon materials may further contain a non-metallic element. For the non-metallic element, there is no particular limitation, but for example: an alkaline metal such as hydrogen, sodium, potassium, and rubidium; an alkaline earth metal such as magnesium and calcium; carbon; boron; nitrogen; phosphorous; and the like can be given.

Of these non-carbon materials, the silicon compound is preferable, the silicon oxide material is more preferable, and silicon oxide represented by the formula SiOx (x is the same as the above) is particularly preferable. With respect to the non-carbon material, one can be used alone, or if required, two or more can be used in a combination.

These non-carbon materials have the feature of having an extremely large amount of energy. In contrast to the carbon material conventionally used as a negative electrode active material (hereinafter referred to as "conventional carbon material") having an energy density per volume of 500 to 600 mAh/cc, these non-carbon materials have an energy density 3 to 5 times higher, silicon being 2400 mAh/cc and the tin oxide being 1400 mAh/cc. Therefore, differing from the case of using a conventional carbon material, the balance between the thickness of the positive electrode 10 and that of the negative electrode 12 is able to be adjusted appropriately.

For example, it becomes possible to provide the negative electrode 12 in a form of a thin film having a thickness of about several micrometers. Forming the negative electrode 12 in a thin film form by using a non-carbon material enables achievements of high output, as well as miniaturization, high capacity, and the like for the electricity storage device 1. In addition, from the fact that a positive electrode active material of an electric double-layer capacitor such as an activated carbon has a volume energy density of about 30 mAh/cc, even compared to this, a non-carbon material has an extremely high energy density being about 50 to 80 times higher. In addition, since a non-carbon material has a low negative electrode potential as with a conventional carbon material, the electricity storage device 1 having a high voltage of about 3V can be obtained.

Figure 3:
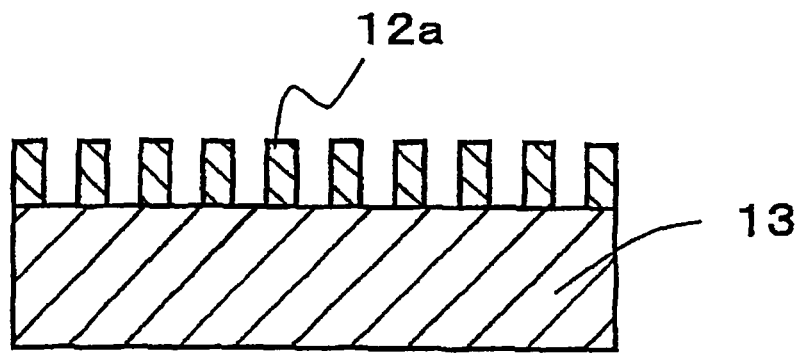
FIG. 3 is a vertical sectional view schematically showing the constitution of a negative electrode 12a, being a different form of a negative electrode formed on the surface of the negative electrode current collector 13.

In order to form the negative electrode 12 in thin-film form directly on the surface of the negative electrode current collector 13, for example, common film-forming methods such as vacuum vapor deposition, sputtering, gas deposition, CVD, and plating can be employed. At this time, the negative electrode thickness can be adjusted by appropriately selecting the film-forming conditions. When forming the negative electrode that contains the non-carbon material and the inorganic compound, a film-forming method may be appropriately selected depending on the characteristics of the inorganic compound. For example, if the inorganic compound is a compound capable of undergoing vapor deposition, the negative electrode can be formed through vapor co-deposition of the non-carbon material and the inorganic compound. In the present embodiment, the negative electrode 12 is formed on the entire face of the surface of the negative electrode current collector 13 as shown in FIG. 2. However, there is no limitation to this, and the negative electrode 12 may be formed in a pattern form on the surface of the negative electrode current collector 13. For the negative electrode formed in a pattern form, for example, a negative electrode 12a shown in FIG. 3 can be given. FIG. 3 is a vertical sectional view schematically showing the constitution of the negative electrode 12a which is different form of the negative electrode formed on the surface of the negative electrode current collector 13. The negative electrode 12a is formed in a stripe form. There is no limitation to this, and the negative electrode 12a may be formed, for example, in patterns such as grids and circular stripes. For methods for forming the negative electrode 12 in a pattern form on the negative electrode current collector 13, for example: a method for forming a film of the negative electrode 12 using a mask; a method for performing oblique vapor deposition on the negative electrode current collector 13 having depressions and projections on the surface thereof; a method for partially removing the negative electrode 12 by means such as etching, after forming the negative electrode 12 on the entire face of the surface of the negative electrode current collector 13; and the like can be given.

The negative electrode 12 is formed in a thin-film form with the specific surface area being preferably 5 or larger, more preferably 10 or larger. If the specific surface area is smaller than 5, reduction in capacity becomes remarkable in the electricity storage device 1 at times of high output, and thus, there is a possibility that stable high output may not be obtained. It should be noted that there is no upper limit to the specific surface area, but under present circumstances, the negative electrode having the specific surface area of about 10 can be formed.

The specific surface area of the negative electrode 12 can be adjusted by appropriately selecting the film-forming conditions, when fabrication of the negative electrode is according to a common film-forming method such as vacuum vapor deposition and sputtering.

In the present invention, a specific surface area is referred to as a ratio of: the surface area within the set measurement range; to the apparent area within the measurement range (surface area within the measurement range/apparent area within the measurement range). The surface area within the measurement range is measured using a laser microscope (Product Name: Super Depth Surface Profile Measurement Microscope VK-85, Keyence Corporation). For methods for measuring the surface area of a material, there are: a method for measuring only the outline area of a material; a method for measuring the outline area of a material and the areas of depressions, projections, and cracks on the material surface; a method for measuring the area of pores that extend inward into a material, along with the outline area of the material and the areas of depressions, projections, and cracks on the material surface; and the like. In addition, a specific surface area which differs in significance depending on the method of measurement can be obtained. In a method of measuring the surface area using a laser, the surface area within the measurement range (total of the outline area of a material and the areas of depressions, projections, and cracks on the material surface) can be easily measured without destroying the object for measurement. Further, the method for measuring the surface area using a laser has the advantage of being able to nearly precisely measure the surface area of a material whose specific surface area value is about 3 to 10, and therefore, is preferable for measuring the surface areas of the negative electrode 12, the negative electrode current collector 13, and the like in the present invention. In contrast, an apparent area within the measurement range is an area when the measurement range is assumed to be for a flat surface. Therefore, the apparent area can be automatically obtained by setting the measurement range. It should be noted that, not included for measurement by the measurement methods in the present invention are the depressions, projections and cracks of a shadowed part that is indiscernible when the measurement range is seen perpendicularly from above. Here, by "indiscernible" is meant the inability of the laser microscope to discern.

The measurement range is set as follows. First, one projection is selected from the surface of the material to be measured, and is regarded as a first projection. The width of each side of the peripheral edge portion of the first projection is regarded as W. The value W, in fact, changes per side. Next, in the central portion of the first projection, a part shaped similar to the first projection in which each side of the peripheral edge portion has a width of W/2 or shorter, is regarded as the measurement range.

In addition, the negative electrode 12 having predetermined thickness and specific surface area can be formed, also by adjusting within a specific range the surface roughness (arithmetic mean surface roughness) value Ra (roughness value) of the face of the negative electrode current collector 13 on which the negative electrode 12 is formed. If the surface roughness Ra of the negative electrode current collector 13 is adjusted, the negative electrode 12 having a predetermined specific surface area can be easily formed, even without rigorously adjusting the film-forming conditions. At this time, it is preferable that the surface roughness value Ra of the negative electrode current collector 13 is equal to or greater than the thickness of the negative electrode 12. Said differently, it is preferable that the thickness of the negative electrode 12 immediately after being formed and not containing lithium, is equal to or less than the surface roughness value Ra of the negative electrode current collector 13. Due to this, the depressions and projections on the surface of the negative electrode current collector 13 are nearly precisely reproduced on the surface of the negative electrode 12, and the negative electrode 12 having a predetermined specific surface area can be obtained. If the thickness of the negative electrode 12 exceeds the surface roughness value Ra of the negative electrode current collector 13, the ability of the negative electrode 12 to follow the depressions and projections on the surface of the negative electrode current collector 13 would be lost. As a result, there is a possibility that the depressions and projections on the surface of the negative electrode current collector 13 may be flattened by the negative electrode 12, thereby resulting in being unable to obtain the negative electrode 12 having a predetermined specific surface area. The surface roughness Ra of the negative electrode current collector 13 is preferably 10 μm or smaller, more preferably 5 μm or smaller, and further preferably 1 to 2 μm. The surface roughness Ra of the negative electrode current collector 13 is, for example, appropriately adjusted by a common surface roughening method, and the like. In the present specification, the surface roughness Ra of the negative electrode current collector 13 is a value that is determined based on the method set forth in JIS B0601-1994 of the Japanese Industrial Standards.

Further, the negative electrode 12 having predetermined thickness and specific surface area can be formed comparatively easily, by also adjusting the specific surface area of the face of the negative electrode current collector 13 on which the negative electrode 12 is formed, to preferably 5 or larger, and more preferably 10 or larger. At this time also, in order for the thickness of the negative electrode 12 to become equal to or less than the surface roughness value Ra, it is preferable that the film-forming conditions such as film-forming time and the like are appropriately selected.

During charging/discharging of the electricity storage device, it is preferable that SOC (state of charge) of the negative electrode is not lower than 20% and not higher than 95%. Due to this, an electricity storage device having high capacity, high output, and excellent repeated charge/discharge life characteristics can be obtained.

It should be noted that SOC of the negative electrode is an indication showing the charged state, not of the entire electricity storage device, but of a single negative electrode, and is a value expressing as percentage, the ratio of the charged amount relative to the fully-charged amount, with the capacity of the single negative electrode being 100% when fully-charged. Therefore, SOC of a completely-discharged state is 0% and SOC of a fully-charged state is 100%.

SOC of the negative electrode can be obtained by the following manner. The SOC value can be obtained by: defining that SOC is 100% (is at a fully-charged state) for the charged amount of the negative electrode when charged at 0.2 CA (5-hour rate) for the negative electrode capacity, within the potential range of 0 to 1.5 V versus lithium; and then, obtaining the SOC value based on this charged amount.

Figure 4:
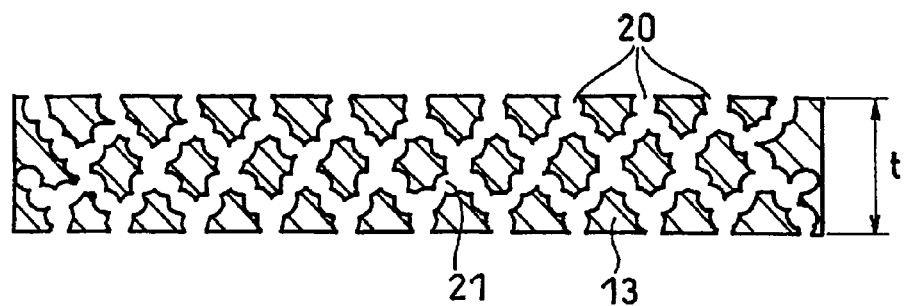
FIG. 4 is a vertical sectional view schematically showing the constitution of the negative electrode current collector 13.
Figure 5:
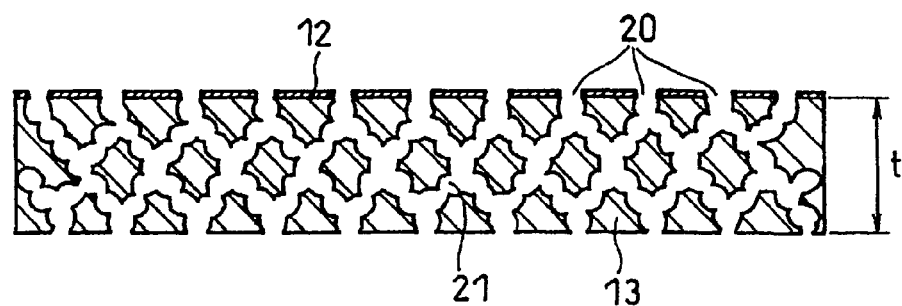
FIG. 5 is a vertical sectional view schematically showing the constitution of a negative electrode stacking body composed of the negative electrode 12 and the negative electrode current collector 13.

The negative electrode current collector 13, as shown in FIG. 4 and FIG. 5, has a plurality of through-holes 20 that penetrate through the film-form negative electrode current collector 13 in the thickness direction thereof, and this through-hole 20 serves as an electrolyte retention portion. Inside the negative electrode current collector 13, a plurality of interconnecting cells 21 that extend in the thickness direction of the negative electrode current collector 13 are mainly present. One end of the interconnecting cells 21 reaches to one surface of the negative electrode current collector 13, the surface facing the thickness direction, and the other end of the interconnecting cells 21 reaches to the other surface of the negative electrode current collector 13, the surface facing the thickness direction. For the interconnecting cells 21, a plurality of cells connect continuously, and since each cell has an internal space, the internal space of each cell communicates with one another inside the interconnecting cells 21, thereby forming one through-hole 20.

By having the through-hole 20, an electrolyte solution can be impregnated and retained in this through-hole 20. That is, an electrolyte (an electrolyte solution) of an anion and a cation can be retained inside the negative electrode current collector 13 that is provided by being in contact with the negative electrode 12. Even if an electrolyte can not be sufficiently retained inside the negative electrode 12, the amount of electrolyte required inside the electricity storage device 1 can be secured by retaining sufficient amount of electrolyte inside the negative electrode current collector 13. In FIG. 5, the negative electrode 12 is formed on one face of the negative electrode current collector 13 having a plurality of through-holes 20, the face facing the thickness direction. Even after the negative electrode 12 is formed as a film on the negative electrode current collector 13, in order to impregnate and retain an electrolyte inside the negative electrode current collector 13, the thickness of the negative electrode 12 is preferably made smaller than the pore diameter of the through-hole 20. Said differently, it is preferable that the pore diameter of the through-hole 20 is larger than the thickness of the negative electrode 12. Specifically, the pore diameter of the through-hole 20 is preferably 2 or more times, more preferably 5 or more times, and further preferably 5 to 10 times the thickness of the negative electrode 12. It should be noted that the pore diameter of the through-hole 20 can be measured, for example, by gas adsorption measurement or mercury porosimetry. In addition, the pore diameter of the through-hole 20 is often with distribution, and therefore, the through-hole 20 can be referred to with the volume-based median micropore diameter as the representative value.

It is preferable that the percentage of the capacity of the electrolyte retention portion relative to the volume occupied by the negative electrode current collector 13 (total of the internal volume of the through-hole 20) (hereinafter referred to simply as "volume ratio of the electrolyte retention portion") is 30% or higher.

The volume ratio of the electrolyte retention portion is more preferably 50% or higher, and further preferably, 50 to 95%. If the volume ratio of the electrolyte retention portion is lower than 30%, the amount of electrolyte salt near the negative electrode 12 becomes insufficient, and thus, the charge/discharge capacity of the electricity storage device 1 may become lower. It should be noted that the volume ratio of the electrolyte retention portion can be measured by gas adsorption measurement or mercury porosimetry. As an example of gas adsorption measurement, measurement using an equipment for measuring specific surface area and micropore distribution (Product Name: ASAP 2010 manufactured by Shimadzu Corporation) can be given. This measurement equipment measures the micropore volume by means of gas adsorption/desorption, and can measure a micropore having a micropore diameter of about several A to 0.1 μm. In addition, as another example, measurement using a mercury porosimeter (Product Name: Autopore III 9410 manufactured by Shimadzu Corporation) can be given. This measurement equipment measures the micropore volume by means of press-fitting mercury into a micropore, and can measure a micropore having a micropore diameter of about several nm to 500 μm. Either one of these measurement equipment can be chosen for use, depending on the micropore diameter of the object to be measured.

For the negative electrode current collector 13 having through-holes 20, for example, a porous body such as a foam and a mesh can be used. In addition, for the material with which the negative electrode current collector 13 is composed, a material which is used for a negative electrode current collector of a lithium-ion battery can be used. However, considering the workability due to achieving micropores, a metal material such as copper and nickel is preferable. It should be noted that for a foam: the interconnecting cells formed inside the foam is the electrolyte retention portion; the total volume of the interconnecting cells is the volume of the electrolyte retention portion; and the porosity of the foam turns out to be the volume ratio of the electrolyte retention rate relative to the volume occupied by the negative electrode current collector 13.

Figure 6:
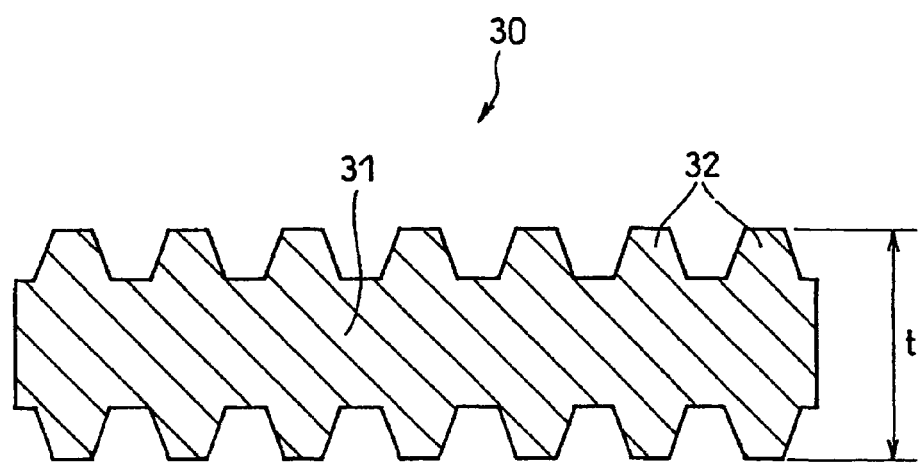
FIG. 6 is a vertical sectional view schematically showing the constitution of a negative electrode current collector 30, being a different form of a negative electrode current collector.
Figure 7:
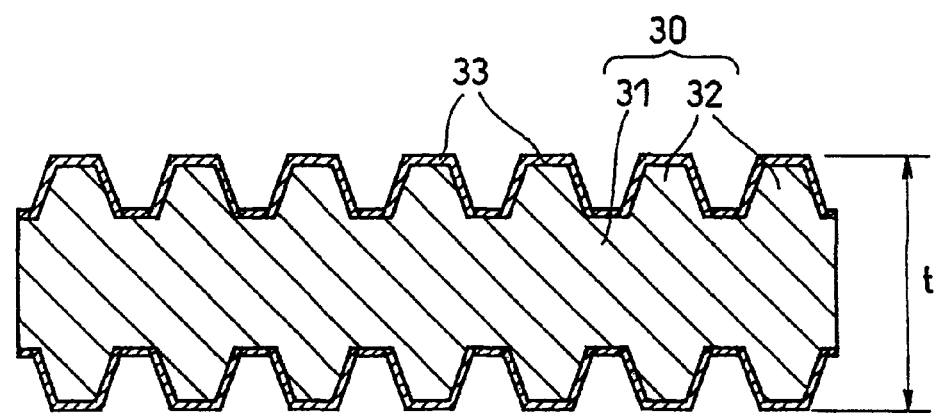
FIG. 7 is a vertical sectional view schematically showing the constitution of a negative electrode stacking body composed of a negative electrode 33 and the negative electrode current collector 30 shown in FIG. 6.

Here, FIG. 6 is a vertical sectional view schematically showing the constitution of a negative electrode current collector 30, which is the negative electrode current collector in a different form. FIG. 7 is a vertical sectional view schematically showing a negative electrode stacking body composed from a thin-film negative electrode 33 and the negative electrode current collector 30 shown in FIG. 6. The negative electrode current collector 30 has the feature of including a current-collecting film 31 and projections 32. The current-collecting film 31 is composed of a material used for the negative electrode current collector of a lithium-ion battery. A plurality of projections 32 are formed on both faces of the current-collecting film 31, each face facing the thickness direction, with the projections extending outward from each surface of the current-collecting film 31. The current-collecting film 31 does not have through-holes that penetrate in the thickness direction.

For the negative electrode current collector 30, a negative electrode 33 is formed at least on the tip portion of the projection 32. When this negative electrode current collector 30 is brought into contact with the separator 14 with the negative electrode 33 therebetween, due to the presence of the projection 32, a space is created in which the negative electrode current collector 30 and the separator 14 do not come into direct contact. By impregnating and retaining an electrolyte in this space, the amount of electrolyte salt required for the negative electrode reaction near the negative electrode 33 can be secured. That is, this space becomes the electrolyte retention portion.

The volume of the electrolyte retention portion can be obtained by multiplying: the area unoccupied by the projections relative to the current collector area; and the projection height. Here, the area unoccupied by the projections is referred to as the total of the area within the current-collecting film area, where projections are not formed on the current collector surface. The projection height and the area unoccupied by the projections relative to the current collector area can be measured by surface observation and sectional observation of the current-collecting film, using a laser microscope or an electronic microscope. Specifically, for example, a laser microscope (Product Name: VK-855 manufactured by Keyence Corporation) can be used.

It is preferable that the projection 32 is formed so as to come into contact with the separator 14, not by point, but by face, with the negative electrode 33 provided on that surface therebetween. Therefore, the projection 32 is preferably formed so that the tip (the part farthest from the current-collecting film 31) becomes a face, and more preferably formed so that the tip becomes a face parallel to the surface of the current-collecting film 31. By allowing the tip of the projection 32 become a face, the volume of the electrolyte retention portion is retained for nearly the same volume throughout the entire durable period of the electricity storage device 1, since the tip face unfailingly supports the separator 14. In addition, there is no possibility of the tip of the projection 32 penetrating through the separator 14 and thus causing a short-circuit in the positive and negative electrodes as well as reduction in the product yield. For the projection 32, as long as the tip is formed as a face, shapes of other parts are not particularly limited and can be formed in various shapes. However, in view of stably supporting the separator 14 and the like, the projection 32 is preferably formed so that the cross-section in the thickness direction of the negative electrode current collector 30 is shaped as a trapezoid or a pseudo-trapezoid. A pseudo-trapezoid is a shape of which: the cross-section in the thickness direction is shaped nearly close to a trapezoid; the side that is in contact with the surface of the current-collecting film 31 (hereafter "lower side") is longer than the side farthest from the current-collecting film 31 (hereafter "upper side"); and the upper side is slightly unparallel to the lower side. In this case, the degree of the angle created by an extended line of the upper side and an extended line of the lower side is about several degrees. In addition, at least a part of the upper side of the cross-section in the thickness direction can include a curve. Even if shaped as a pseudo-trapezoid, the forementioned effect can be obtained if the separator 14 can be supported by a face.

Figure 8:
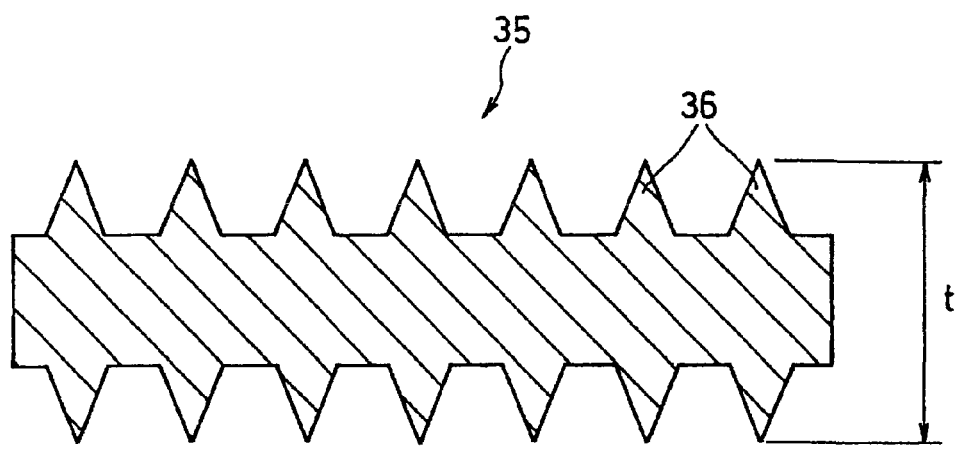
FIG. 8 is a vertical section view schematically showing the constitution of a negative electrode current collector 35 having projections 36, each projection having a cross-section in the thickness direction shaped as a triangle.

Here, a vertical sectional view schematically showing the constitution of the negative electrode current collector 35 in a different form will be shown in FIG. 8. As shown in FIG. 8, for the negative electrode current collector 35, the cross-section of a projection 36 in the thickness direction is shaped as a triangle, and the tip of the projection 36 is sharply pointed. If the tip of the projection 36 is a point, there is a possibility of at least a part of that tip breaking into the separator 14, and in some cases, penetrating through the separator 14. In addition, there is a possibility of the tip of the projection 36 penetrating through the separator 14, causing a short-circuit between the positive and negative electrodes and causing a reduction in the product yield of the electricity storage device 1.

The volume occupied by the negative electrode current collector 30 is expressed by a value resulting from multiplying: the area of the surface of the current-collecting film 31, the surface facing the thickness direction; and the thickness t of the negative electrode current collector 30. Here, the thickness t of the negative electrode current collector 30 is referred to as the length: from the uppermost peak portion of the projection 32 formed on one face of the current-collecting film 31; to the uppermost peak portion of the projection 32 formed on the other face of the current-collecting film 31. In order to make 30% or higher be the percentage of the electrolyte retention portion relative to the volume occupied by the negative electrode current collector 30, for example, the height of the projection 32, the total area of the face formed at the tip of the projection 32, the interval between projections 32, the number of projections 32, and the like may be appropriately adjusted. The height of the projection 32 is referred to as the length from the surface of the current-collecting film 31 to the uppermost peak portion of the projection 32.

The negative electrode current collector 30, for example, can be fabricated through forming a plurality of projections 32 on each surface of the current-collecting film 31, each surface facing the thickness direction, by means of mechanically working the current-collecting film 31. Mechanical working is, for example, press-working, roller-working, and the like. In addition, the negative electrode current collector 30 can be obtained, also by performing: surface treatment such as polishing, etching, and patterning; plating (such as electrolytic plating, non-electrolytic plating, and electrodeposition; spraying of fine particles; and the like. Here, a copper foil, a nickel foil, and the like can be used for the current-collecting film 31.

In addition, when forming the negative electrode 33 on the each surface of the negative electrode current collector 30, it is preferable to take note of the relation between the thickness of the negative electrode 33 and the height of the projection 32. As shown in FIG. 7, it is preferable that the negative electrode 33 is formed so as to follow the shape of the surface of the negative electrode current collector 30, and that the shape of the projection 32 is reproduced on the surface of the negative electrode 33. Due to this, the electrolyte retention portion which is the space for retaining an electrolyte can be secured on the surface of the negative electrode 33, even after the formation of the negative electrode 33. Therefore, the thickness of the negative electrode 33 is required to be sufficiently thin in contrast to the height of the projection 32 that is present on the surface of the negative electrode current collector 30. Specifically, the height of the projection 32 is preferably 2 or more times, more preferably 5 or more times, and further preferably 5 to 10 times the thickness of the negative electrode 33.

Figure 9:
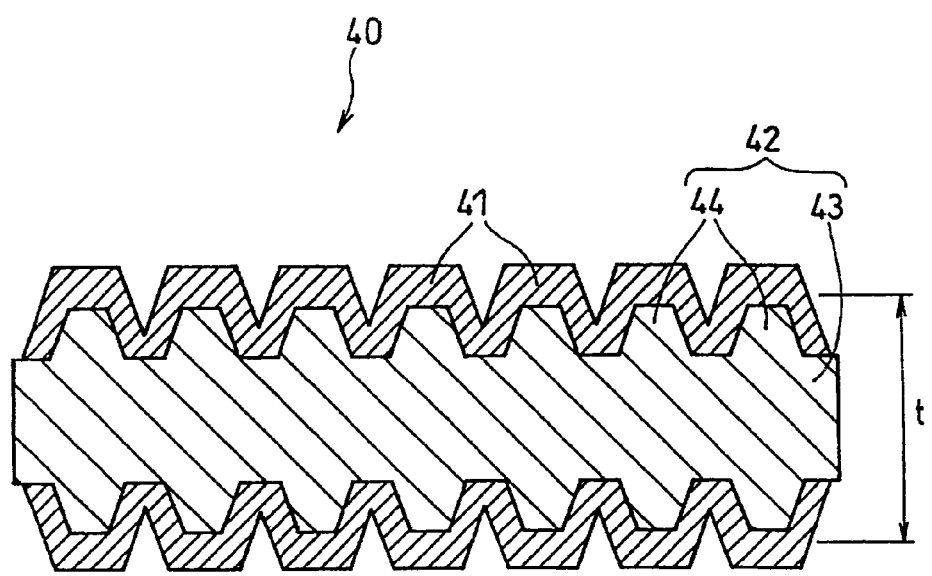
FIG. 9 is a vertical sectional view schematically showing the constitution of a negative electrode stacking body 40 having projections 44, each projection lacking in height.

When the height of the projection 32 is less than twice the thickness of the negative electrode 33, the space for the electrolyte retention portion secured due to projections 32 becomes small. FIG. 9 is a vertical sectional view schematically showing the constitution of a negative electrode stacking body 40. The negative electrode stacking body 40 includes a negative electrode 41 and a negative electrode current collector 42. The negative electrode current collector 42 includes a current-collecting film 43 and projections 44. In the negative electrode stacking body 40, the height of the projection 44 is less than twice the thickness of the film formed as the negative electrode 41. Since the negative electrode 41 is formed not only on the face at the tip of the projection 44, but also on the side face of the projection 44, the space between adjacent projections 44 becomes narrow in particular. As a result, the space for the electrolyte retention portion that should be created due to the presence of projections 44 becomes extremely small, and thus, the amount of electrolyte solution that can be retained by the negative electrode current collector 42 decreases.

It should be noted that in the negative electrode current collector 30, projections 32 are formed on both faces facing the thickness direction. However, there is no limitations to this, and a plurality of projections 32 can be formed only on the face that is in contact with the separator 14 in the negative electrode current collector 30. In that case, the thin-film negative electrode 33 can be disposed only on the face on which projections 32 are formed.

In addition, after the negative electrode 12 is formed on the surface of the negative electrode current collector 13, it is preferable that a predetermined quantity of electricity is charged to the negative electrode 12 in advance. That is, it is preferable that a predetermined amount of lithium is absorbed in the negative electrode 12 in advance. In the present specification, to charge a quantity of electricity to the negative electrode 12 in advance means to charge a quantity of electricity to the negative electrode 12 and allow lithium to be absorbed in the negative electrode active material, prior to the fabrication (assembling) of the electricity storage device 1. This is due to the negative electrode 12 having an irreversible capacity immediately after the fabrication of the electricity storage device 1. An irreversible capacity is referred to as a capacity out of the electric capacity charged to the negative electrode 12 that is consumed by a side reaction other than an absorption/desorption reaction of lithium that contributes to the charge/discharging reaction of the negative electrode active material. That is, an irreversible capacity is a capacity incapable of reversible discharging although charging has been carried out, and is well known to be observed only at initial charging/discharging.

A known method can be employed when charging a predetermined quantity of electricity to the negative electrode 12 in advance, and for example, methods such as mechanical charging, electrochemical charging, and chemical charging can be given. According to mechanical charging, for example, charging is carried out by mechanically bringing a material having a lower potential (such as metallic lithium) than the negative electrode active material into contact with the negative electrode active material. More specifically, for example, charging may be carried out after: a predetermined amount of metallic lithium is attached on the surface of the negative electrode 12; metallic lithium is formed as a film directly on the surface of the negative electrode 12 by means of a vacuum process such as vapor deposition; or metallic lithium produced on a plastic substrate having undergone a demolding process is transferred on the surface of the negative electrode 12. In addition, in mechanical charging, it is also possible to shorten the time required for charging reaction by expediting the progression of charging reaction by applying heat to the negative electrode 12 after bringing the material with a lower potential than the negative electrode active material into contact with the surface of the negative electrode 12.

According to electrochemical charging, the negative electrode 12 is charged, for example, by immersing the negative electrode 12 and a counter electrode in an electrolyte solution, thereby allowing current to pass between the negative electrode 12 and the counter electrode. At this time, for example, metallic lithium can be used for the counter electrode. For the electrolyte solution, for example, a non-aqueous solvent in which lithium salt is dissolved can be used. In addition, an electrolyte solution generally used in lithium-ion batteries may also be used. It is also possible to carry out the charging process on the negative electrode 12 after fabrication of the electricity storage device 1, if a third electrode (not shown) other than the positive electrode 10 and the negative electrode 12 is introduced inside the electricity storage device 1 after fabrication.

According to chemical charging, for example, the negative electrode 12 is charged by: allowing a compound containing lithium-ion such as butyllithium to dissolve in an organic solvent; then, allowing this solution to come into contact with the negative electrode 12; and thus, allowing a chemical reaction to occur. The lithium-ion-containing compound solution is brought into contact with the negative electrode 12, for example, by allowing the negative electrode 12 to be immersed in that solution.

Of these charging methods, in electrochemical charging and chemical charging, it is required to take out the negative electrode 12 after charging, and remove the solvent, the electrolyte salt, other compounds to be used in the charging process, and the like, by means of cleansing. In addition, a long period of time is required for the charging process itself. In addition, there are cases where the surface of the negative electrode 12 deteriorates during cleansing of the negative electrode 12 after charging, since the potential of the negative electrode 12 after charging becomes close to the lithium potential and extremely low, thereby resulting in increased reactivity. In contrast, in mechanical charging, since only lithium is brought into contact with the negative electrode 12, there is no need for cleansing, and the required time is also short. There is also no deterioration on the surface of the negative electrode 12.

Therefore, from the aspects of fabrication and characteristics, mechanical charging is preferable. Of the methods in mechanical charging, a method for forming metallic lithium directly on the surface of the negative electrode 12 by means of a thin-film forming process such as vapor deposition is most preferable. This is because controlling the process of attaching metallic lithium, and the like is, in fact, difficult due to the negative electrode 12 in the electricity storage device of the present invention being a thin-film negative electrode having a thickness of 10 µm or less, thereby also requiring lithium that should be charged to be controlled by using a lithium thin film having a thickness of 10 µm or less, and in some cases, 5 µm or less. Therefore, in terms of thickness controllability and processing time, mechanical charging by means of a thin-film forming process such as vapor deposition is preferable. By carrying out mechanical charging, workability of the electricity storage device improves remarkably.

In addition, even when charging a predetermined quantity of electricity to the negative electrode 12, the negative electrode 12 formed directly and binder-free on the negative electrode current collector 13 in the electricity storage device 1 of the present invention is effective. The reason is as follows. For example, in the case of forming lithium as a film on the negative electrode 12 by means of vapor deposition and carrying out mechanical charging, the negative electrode 12 is exposed to lithium that is heated to a high temperature of at least around 179° C., since the melting point of lithium is 179° C. At this time, if lithium is formed as a film on a negative electrode that includes a binder, then, most of the resin materials used as a main component of the binder deteriorate due to causing a chemical reaction with a material high in chemical reactivity and heated up to a temperature around 179° C., like lithium. In contrast, for the electricity storage device 1 of the present invention, since the negative electrode 12 is formed directly on the surface of the negative electrode current collector 13 without including a binder, mechanical charging using a thin-film forming method such as vapor deposition can be applied and is greatly effective.

For the negative electrode current collector 13, types used in various electricity storage devices can be used, and among them, the negative electrode current collector used in lithium-ion batteries can be preferably used. As a specific example of such a negative electrode current collector, for example, a metal foil composed of a metal such as copper and nickel can be given. Among them, a copper foil is preferable, considering workability, and the like. As the form of the negative electrode current collector 13, for example, forms such as: a film having a smooth surface; a film having a roughened surface; a mesh composed of a thin metallic fiber; a porous film; and the like can be given. When using the negative electrode current collector 13 in a form of a film having a roughened surface: the surface roughness (Ra) of the negative electrode current collector plate 13 is preferably about 1 to 2 µm; and the specific surface area is preferably 5 or larger and more preferably 10 or larger, considering the adhesion to the negative electrode 12 and the output characteristics of the electricity storage device 1.

The positive electrode 10 in layer form is provided so that: one face facing the thickness direction thereof is in contact with the separator 14; and the other face facing the thickness direction thereof is in contact with the positive electrode current collector 11, and includes a positive electrode active material. Further, the positive electrode 10 may contain, along with the positive electrode active material, an auxiliary ion-conducting material, an auxiliary electron-conducting material, a binder, and the like.

For the positive electrode active material, a material capable of reversibly adsorbing/desorbing at least anions can be used. For example: a positive electrode active material used in electric double-layer capacitors; a positive electrode active material used in electrochemical capacitors; and the like can be given. The material used for the positive electrode active material as above may also be able to reversibly absorb/desorb cations.

The positive electrode active material used in electric double layer capacitors is not particularly limited, but an activated carbon, an organic compound capable of being oxidized and reduced, and the like can be preferably used. For the activated carbon, an activated carbon having a large specific surface area is preferable. For example, an activated carbon having an extremely large specific surface area of a maximum of about 2000 m$^2$/g can be obtained, by carbonizing a carbon material (such as coconut husk, organic resin, and petroleum pitch) in an inert gas such as a nitrogen gas under a temperature of 900 to 1000° C., and then introducing water vapor into this system. The form of the activated carbon is not particularly limited, and for example, forms of powder, fiber, flake (or scale), and the like can be given.

For the organic compound capable of being oxidized and reduced, for example: an organic compound having a radical; an organic compound having a π-conjugated electron cloud; an indole-based organic compound; and the like can be given. For the organic compound having a radical, for example, an organic compound having in the molecule thereof at least one radical selected from the group consisting of a nitroxy radical, a boron radical, and an oxygen radical can be given. As specific examples of such an organic compound, for example: a nitroxyl radical-containing compound such as 2,2,6,6-Tetramethylpiperidine-1-oxyl, and 2,2,5,5-Tetramethyl-3-imidazolium-1-oxide; a quinone such as quinine and benzoquinone; and the like can be given. For the organic compound having a π-conjugated electron cloud, for example, an organic compound having the structure represented by a general formula (1) below can be given.

[Chemical Formula 1]

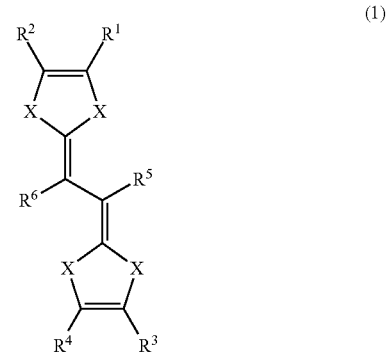

(1)

In the general formula (1), X each independently represents a sulfur atom or an oxygen atom. $R^1$ to $R^4$ each independently represents a chain aliphatic group, a cyclic aliphatic group, a hydrogen atom, a hydroxyl group, a cyano group, an amino group, a nitro group, or a nitroso group. $R^5$ and $R^6$ each independently represents a hydrogen atom, a chain aliphatic group, or a cyclic aliphatic group. However, the chain aliphatic group and the cyclic aliphatic group represented by $R^1$ to $R^6$ may include at least one atom selected from the group consisting of an oxygen atom, a nitrogen atom, a sulfur atom, a silicon atom, a phosphorus atom, a boron atom, and a halogen atom.

An organic compound having the structure represented by a general formula (2) below can be given.

[Chemical Formula 2]

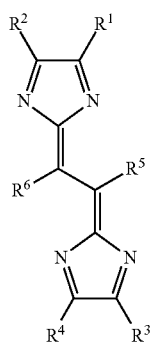

(2)

$R^1$ to $R^6$ in the general formula (2) are the same as $R^1$ to $R^6$ in the general formula (1).

An organic compound having the structure represented by a general formula (3) below can be given.

[Chemical Formula 3]

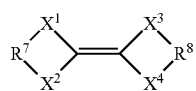

(3)

In the general formula (3), $X^1$ to $X^4$ each independently represents a sulfur atom, an oxygen atom, a selenium atom, or a tellurium atom. $R^7$ and $R^8$ each independently represent a bivalent chain aliphatic group or a bivalent cyclic aliphatic group. However, the bivalent chain aliphatic group and the bivalent cyclic aliphatic group represented by $R^7$ to $R^8$ may include at least one atom selected from the group consisting of an oxygen atom, a nitrogen atom, a sulfur atom, a silicon atom, a phosphorus atom, a boron atom, and a halogen atom.

It should be noted that the monovalent or bivalent chain aliphatic group and cyclic aliphatic group represented by $R^1$ to $R^8$ in the general formulas (1) to (3) as above, may have in their molecular chains, an atom such as an oxygen atom, a nitrogen atom, a sulfur atom, and a phosphorus atom. Here, being allowed to have an atom such as an oxygen atom, a nitrogen atom, a sulfur atom, and a phosphorus atom, means being allowed to have a group that includes at least one of these atoms. For the group having a nitrogen atom, for example, an amino group, an imino group, a cyano group, a nitro group, and the like can be given. For the group having an oxygen atom, for example, an alkoxy group, a hydroxyl group, an alkyl group having a hydroxyl group, an oxo group, and the like can be given. For the group having a sulfur atom, for example, a sulfo group, a sulfonyl group, a sulfonic acid group, a thiocarbonyl group, a sulfamoyl group, an alkylsulfonyl group, and the like can be given. For the group having a silicon atom, for example, a silyl group, and the like can be given. In addition, at least one of these atoms can be incorporated at some midpoint in a saturated or an unsaturated carbon chain for an alkyl group, an alkenyl group, and the like. A boron atom and a halogen atom can be bonded to various substituent groups. A boron atom and a halogen atom may be directly substituted with the monovalent or bivalent chain aliphatic group and cyclic aliphatic group indicated by $R^1$ to $R^6$.

For the indole-based organic compound, for example, an indole trimer such as 5-cyanoindole, a derivative thereof, and the like can be given.

In addition, for the positive electrode active material used in electrochemical capacitors, a material exhibiting a pseudo-double layer capacity that appears due to an oxidation-reduction reaction is also included, besides the positive electrode active material regularly used in electric double layer capacitors. As specific examples of such a positive electrode active material, for example: a metal oxide such as ruthenium oxide, iridium oxide, manganese oxide; a nanocarbon material such as a Nanogate carbon and a carbon nanotube; and the like can be given. For the positive electrode active material, one can be used alone, or two or more can be used in a combination.

The auxiliary ion-conducting material is used, for example, to improve ion conductivity. As specific examples of the auxiliary ion-conducting material, for example: a solid electrolyte such as polyethylene oxide; a gelled electrolyte containing polymethacrylic acid and the like; and the like can be given.

The auxiliary electron-conducting material is used, for example, to improve electron conductivity. As specific examples of the auxiliary electron-conducting material, for example: a carbon material such as carbon black, graphite, and acetylene black; a conductive polymer such as polyaniline, polypyrrole, and polythiophene; and the like can be given.

The binder is used, for example, to improve the bonding of the positive electrode active material. For the binder, for example, polyvinylidene fluoride, vinylidene fluoride-hexafluoropropylene copolymer, vinylidene fluoride-polytetrafluoroethylene, polytetrafluoroethylene, polyethylene, polyimide, polyacrylic acid, carboxymethyl cellulose, acrylonitrile rubber, butadiene rubber, styrene butadiene rubber, and the like can be given.

The thickness of the positive electrode 10 (hereinafter referred to as "the positive electrode thickness") is not particularly limited, but considering electrolyte retention, is preferably 5 or more times, and more preferably 10 or more times the thickness of the negative electrode 12 (hereinafter referred to as "the negative electrode thickness"), for example. It should be noted that the maximum positive electrode thickness is about 50 to 100 times the negative electrode thickness. The reason is because when the positive electrode thickness is about 50 to 100 times the negative electrode thickness and thus too thick, the capacity of the electricity storage device becomes restricted by the negative electrode, thereby causing a reduction in capacity. In the electricity storage device 1 of the present invention, the negative electrode thickness is made thin by forming the negative electrode 12 directly on the surface of the negative electrode current collector 13, as described above. Therefore, there is a possibility of electrolyte retention in the negative electrode 12 degrading. In order to compensate for the above, it is preferable to make the positive electrode thick.

Specifically, it is preferable that the negative electrode thickness is about 2 to 10 µm, and the positive electrode thickness is 10 or more times the negative electrode thickness, being about 20 to 100 µm. It is more preferable that the negative electrode thickness is 2 to 5 µm, and the positive electrode thickness is 10 or more times the negative electrode thickness, being about 20 to 50 µm.

The positive electrode current collector 11 in layer form is provided so that: one face facing the thickness direction thereof is in contact with the positive electrode 10; and the other face facing the thickness direction thereof is in contact with the case 18. For the positive electrode current collector 11, a material generally used for the positive electrode current collector plate in lithium-ion batteries can be used, and for example, aluminum, stainless steel, and the like can be given. The positive electrode current collector 11 is formed in a form of a film or a sheet. In addition, the surface of the positive electrode current collector 11 may be either smooth or roughened. The internal structure of the positive electrode current collector 11 may be: a mesh containing a metallic fiber; a porous body; and the like.

The separator 14 is provided by being interposed between the positive electrode 10 and the negative electrode 12. A separator used in lithium-ion batteries, electric double layer capacitors, and the like can be used for the separator 14, and for example: a microporous film such as that of polypropylene and polyethylene; a non-woven fiber; and the like can be given.

An electrolyte is either carried on or immersed in the separator 14 as required. The electrolyte is not particularly limited, but for example: a supporting salt (electrolyte salt); a liquid electrolyte composed of a non-aqueous solvent in which a supporting salt is dissolved (or a non-aqueous electrolyte solution); a gelled electrolyte; a solid electrolyte; and the like can be given.

For the supporting salt, that which is appropriately selected from among known supporting salts depending on the type of the electricity storage device 1 can be used. For example, when the electricity storage device 1 is used as a lithium-ion battery, salt containing lithium and an anion can be used. The anion is not particularly limited as long as a salt is formed by the anion and lithium, but for example, a halide anion, a percholate anion, a trifluoromethanesulfonate anion, a tetrafluoroborate anion ($BF_4^-$), a hexafluorophosphate anion ($PF_6^-$), a bis(trifluoromethanesulfonyl)imide anion, a bis(perfluoroethylsulfonyl)imide anion, and the like can be given. For the supporting salt, one can be used alone, or two or more may be used in a combination as required.

For the non-aqueous solvent in which a supporting salt is dissolved, that which is appropriately selected from among known non-aqueous solvents depending on the type of the electricity storage device 1 can be used as well. For example, when the electricity storage device 1 is a lithium-ion battery, a non-aqueous electric double layer capacitor, and the like, for the non-aqueous solvent, ethylene carbonate, propylene carbonate, dimethyl carbonate, diethyl carbonate, methyl ethyl carbonate, γ-butyrolactone, tetrahydrofuran, dioxolane, sulfolane, dimethylformamide, acetonitrile, and the like can be used, for example. For the non-aqueous solvent, one may be used alone, or two or more may be used in a combination.

The gelled electrolyte is a liquid electrolyte that is turned into a gel. The gelling of the liquid electrolyte is, for example, performed by adding a gelling agent to the liquid electrolyte. For the gelling agent, those that are regularly used in this field can be used, and for example: a polymer containing polyacrylonitrile, an acrylate compound, or a methacrylate compound as a monomer; a copolymer composed of ethylene and acrylonitrile; and the like can be given. The solid electrolyte is an electrolyte that is in solid form. For the solid electrolyte, for example: $Li_2S$—$SiS_2$; $Li_2S$—$B_2S_5$; $Li_2S$—$P_2S_5$—$GeS_2$; a mixture of sodium and alumina ($Al_2O_3$); an amorphous polyether; polyether with a low phase transition temperature (Tg); an amorphous vinylidene fluoride-hexafluoropropylene copolymer; polyethylene oxide of a heterogeneous polymer blend; and the like can be given. When the gelled electrolyte and the solid electrolyte are used, the electricity storage device 1 may be composed without using the separator 14, with only the electrolyte disposed between the positive electrode 10 and the negative electrode 12.

For each of the sealing plate 15, the gasket 16, the spacer 17, and the case 18, those that are regularly used in this field can be used.

The electricity storage device 1 can be fabricated, for example, by: stacking the spacer 17, the negative electrode current collector 13, the negative electrode 12, the separator 14, the positive electrode 10, and the positive electrode current collector 11 in this order in the thickness direction; interposing the obtained stacking body between the sealing plate 15 and the case 18; and then crimping the sealing plate 15 and the case 18 together with the gasket 16 therebetween. It should be noted that the spacer 17 need not be provided, when contact pressure is sufficient for each member in the electricity storage device 1 such as the negative electrode current collector 13, the negative electrode 12, the separator 14, the positive electrode 10, and the positive electrode current collector 11. That is, whether or not to provide the spacer 17 may be appropriately determined depending on the contact pressure of each forementioned member.

The electricity storage device of the present invention can be suitably used, for example: as a power supply for hybrid cars, various electrical and electronic equipments (particularly mobile communications equipments and portable electronic equipments such as laptop personal computers and cellular phones); as a electricity storage device for generating-power leveling such as thermal power generation, wind power generation, and fuel cell power generation; as a power supply for emergency electricity storage system for general households and collective housings and midnight electric-powered electricity storage system; as an uninterruptible power supply; and the like.

As embodiments of the present invention, examples of the electricity storage device used in a cellular phone, and the like will be described below.

Embodiment 1

Figure 10:
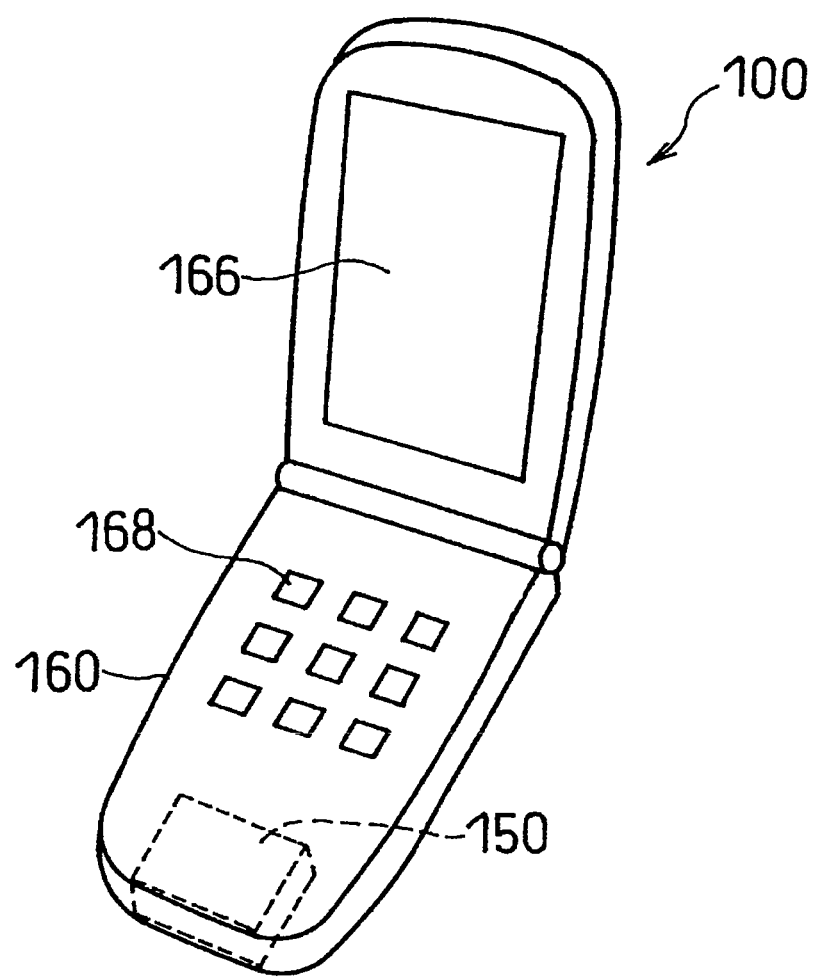
FIG. 10 is a schematic perspective view of a cellular phone using an electricity storage device of the present invention.

One example of a cellular phone using the electricity storage device of the present invention will be described with reference to FIG. 10. FIG. 10 is a schematic perspective view of a cellular phone 100 using an electricity storage device of the present invention. As shown in FIG. 10, the cellular phone 100 has a display portion 166 such as a liquid crystal panel and an input portion 168. Inside a housing 160 provided with the input portion 168, an electronic control circuit portion (not shown) and an electricity storage device 150 of the present invention as a power supply portion are provided. The control circuit portion controls, for example, the charged amount (SOC) of the electricity storage device, the display of the panel, and in addition, the voltage of the electricity storage device during charging.

For the electricity storage device 150, the electricity storage device of the present invention and a conventional electricity storage device may be used in a combination. For the conventional electricity storage device, for example, a lithium-ion battery, a nickel-metal hydride storage battery, a capacitor, or a fuel cell can be given.

Since the electricity storage device of the present invention can be miniaturized and thinned, the space required for installing the electricity storage device can be made smaller, and thus a cellular phone can be miniaturized and thinned. Since the electricity storage device of the present invention can be charged at high rate, the charging time can be shortened. Since the electricity storage device of the present invention has high output and high capacity, higher performance such as extending continuous talk time is made possible.

Embodiment 2

Figure 11:
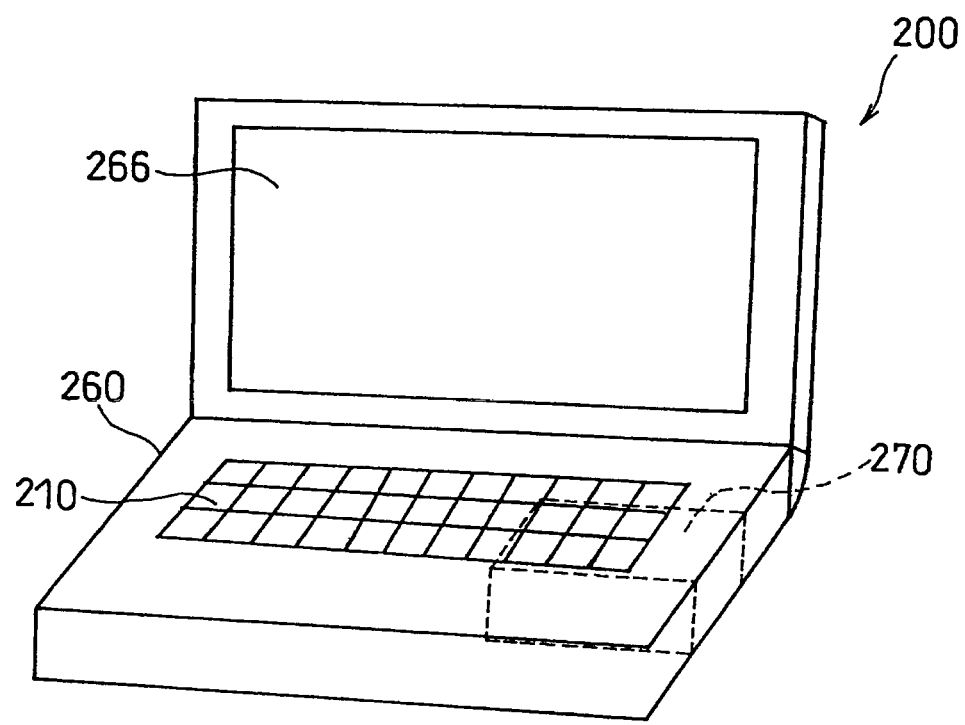
FIG. 11 is a schematic perspective view of a laptop personal computer using an electricity storage device of the present invention.

One example of a laptop personal computer using the electricity storage device of the present invention will be described with reference to FIG. 11. FIG. 11 is a schematic perspective view of a laptop personal computer 200 using an electricity storage device of the present invention. As shown in FIG. 11, the laptop personal computer 200 has a housing 260 provided with a display portion 266 such as a liquid crystal panel, and the like and a key operating portion 210. Inside the housing portion 260, an electronic control circuit portion (not shown) including the CPU and the like, a cooling fan (not shown), and an electricity storage device 270 of the present invention as a power supply portion are provided.

For the electricity storage device 270, the electricity storage device of the present invention and a conventional electricity storage device may be used in a combination. As the conventional electricity storage device, for example, a lithium-ion battery, a nickel-metal hydride storage battery, a capacitor, or a fuel cell can be given.

Since the electricity storage device of the present invention can be miniaturized and thinned, the space required for installing the electricity storage device can be made smaller, and thus a laptop personal computer can be miniaturized and thinned. Since the electricity storage device of the present invention can be charged at high rate, the charging time can be shortened. Since the electricity storage device of the present invention has high output and high capacity, use of a laptop personal computer for longer hours or faster startup is made possible.

Embodiment 3

Figure 12:
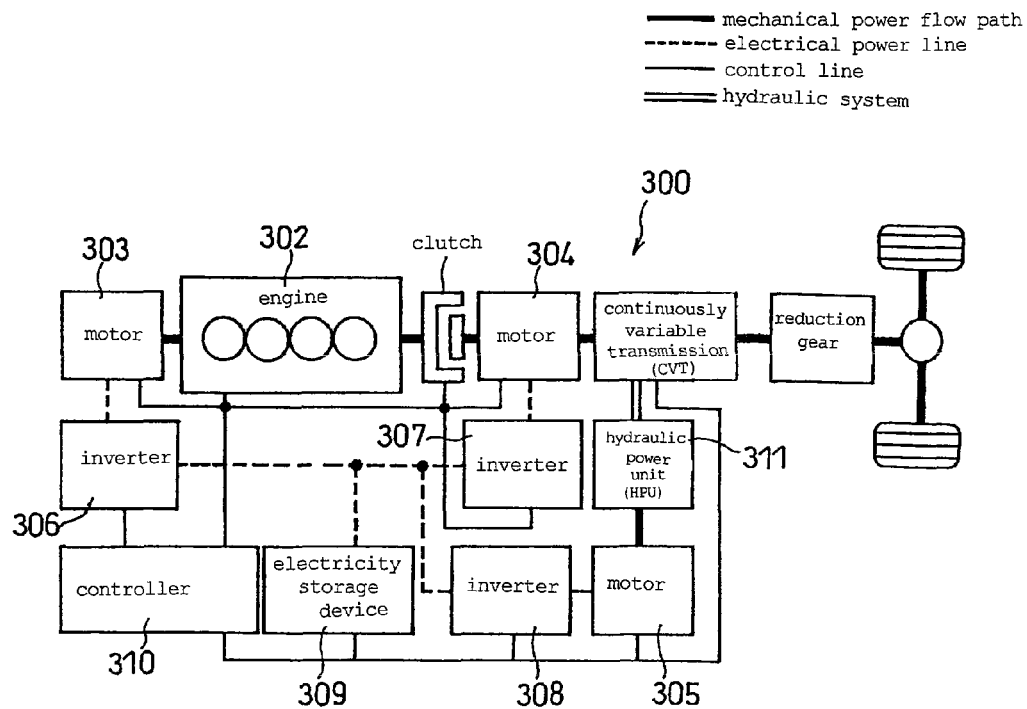
FIG. 12 is a schematic configuration of a hybrid car using an electricity storage device of the present invention.

One example of a hybrid car using the electricity storage device of the present invention will be described with reference to FIG. 12. FIG. 12 is a view showing the configuration of a hybrid car 300 using an electricity storage device of the present invention. As shown in FIG. 12, the hybrid car 300 comprises: an engine 302; a plurality of motors 303, 304, and 305; inverters 306, 307, and 308 that are each connected to these motors; an electricity storage device 309 as a power supply portion that supplies electric power; and a controller 310 that controls the entire system. The motor 303 is the motor for starting the engine 302 or assisting the car to start, and also functions as a generator. The motor 304 is the motor for driving, and the motor 305 is the motor for power steering. Due to discharging (supplying of power) performed by the electricity storage device 309, the motor 303 is activated, thereby starting the engine 302 or assisting the car to start, and the motor 305 connected to a hydraulic power unit 311 operates at high speed. The charging of the electricity storage device 309 is carried out by using the motor 303 as a generator and converting the driving power of the engine 302 to electric power.

For the electricity storage device 309, the electricity storage device of the present invention and a conventional electricity storage device may be used in a combination. As the conventional electricity storage device, for example, a lithium-ion battery, a nickel-metal hydride storage battery, a capacitor, or a fuel cell can be given.

Since the electricity storage device of the present invention can be miniaturized and thinned, a car can be made more lightweight. In addition, the space required for providing the electricity storage device can be made smaller, and thus, larger storage space and seating space can be secured. The electricity storage device of the present invention can be charged/discharged at high rate and has high output and high capacity, thereby being able to support various driving modes and contribute to the improvement of fuel efficiency of the car.

EXAMPLES

Examples of the present invention will be described specifically below, but the present invention is not limited to these Examples.

Example 1

A coin-type electricity storage device, same as that shown in FIG. 1, was fabricated in the following manner.
(1) Fabrication of Positive Electrode 100 mg of an activated carbon powder (specific surface area of 1700 m$^2$/g, number average particle size of 2 μm) as a positive electrode active material and 20 mg of acetylene black as an auxiliary electron conductive material was uniformly mixed. To this mixture, 20 mg of polyvinylpyrrolidone and 800 mg of methanol was added, and thus, a positive electrode material mixture slurry was prepared. This positive electrode material mixture slurry was applied to a positive electrode current collector (thickness of 15 μm) composed of an aluminum foil and then vacuum-dried to obtain a positive electrode in layer form on the surface of the aluminum foil. A positive electrode stacking body composed of this positive electrode current collector and this positive electrode was cut and punched out to be a disc shape having a diameter of 13.5 mm. At this time, the weight of the positive electrode active material applied was 6.1 mg/cm$^2$ and the positive electrode thickness was 45 μm. It should be noted that the activated carbon powder which was the positive electrode active material, was obtained by carbonizing a phenolic resin-based carbon material in nitrogen gas, and then performing an activation treatment by introducing water vapor.

In addition, when an electric double layer capacitor that was obtained by using this positive electrode stacking body and using a stacking body of exactly the same constitution as above as a counter electrode (a negative electrode), was operated (charged/discharged) within the range of 0 to 1 V for a single electrode potential (0 to 2 V for an electricity storage device), the capacity of the electricity storage device was 0.8 mAh.
(2) Fabrication of Negative Electrode For a negative electrode current collector, a copper foil (specific surface area of 11.6, arithmetic mean surface roughness (Ra) of 2.0 μm, thickness of 43 μm) was used. On this copper foil, a negative electrode (thickness of 6 μm, specific surface area of 4.2) composed of a thin film of a silicon oxide (SiOx) was formed by means of an electron beam heating vapor deposition. The specific surface area and the arithmetic mean surface roughness were measured by using a laser microscope (Product Name: Super Depth Surface Profile Measurement Microscope VK-855, Keyence Corporation). The thickness of the negative electrode current collector and the negative electrode were measured by a scanning electron microscope (SEM). The volume ratio of the electrolyte retention portion of the negative electrode current collector was obtained in the same manner as Example 10 described below.

In this manner, a negative electrode stacking body composed of the negative electrode current collector and the negative electrode was obtained. The negative electrode thickness was adjusted by adjusting the vapor deposition time. The conditions for electron beam heating vapor deposition were as follows. A silicon metal having a purity of 99.9999% (manufactured by Kojundo Chemical Laboratory Co., Ltd.) was used as a vapor deposition source, and the degree of vacuum was adjusted to $3\times10^{-3}$ Pa by introducing oxygen gas having a purity of 99.7% into a vacuum chamber. In addition, the acceleration voltage of the electron beam for irradiating the vapor deposition source was 8 kV and the emission was 500 mA. After forming the negative electrode, the composition was analyzed by fluorescent X-ray analysis, and as a result, the ratio of Si to O in the negative electrode was Si:O=1:0.6 (molar ratio). From this, it was found that the value x of silicon oxide (SiOx) composing the negative electrode was 0.6.

Next, the capacity of the negative electrode obtained above was confirmed as below. A coin-type electricity storage device was fabricated by placing opposite of one another: a negative electrode stacking body fabricated in the same manner as above, cut and punched out to be a disc shape having a diameter of 13.5 mm; and a counter electrode composed of a lithium metal plate (thickness of 300 μm), with a separator (thickness of 20 μm) composed of a microporous polyethylene sheet interposed therebetween. This electricity storage device was charged/discharged 3 times. At this time, the current value, the upper voltage limit, and the lower voltage limit were 0.5 mA, 1.5 V, and 0 V, respectively. It was confirmed that due to this charging/discharging, the reversible capacity capable of charging/discharging was 1.8 mAh (capacity per unit area: 1.3 mAh/cm$^2$), and the irreversible capacity not contributing to charging/discharging was 0.5 mAh.

The negative electrode immediately after fabrication obtained above did not contain lithium, and therefore, was in a completely-discharged state, that is, was 0% SOC (State of Charge). SOC of the negative electrode is an indication showing the charged state, not of the entire electricity storage device, but of a single negative electrode, and is a value expressing as percentage, the ratio of the charged amount relative to the fully-charged amount, with the capacity of the single negative electrode being 100% when fully-charged. Therefore, SOC of a completely-discharged state is 0% and SOC of a fully-charged state is 100%.

In the present example, SOC of the negative electrode was adjusted to 50%, by forming a lithium metal layer having a thickness of 4.5 μm on the surface of the negative electrode obtained above, by means of vapor deposition. Here, SOC of the negative electrode was obtained by: making the charged amount of the negative electrode be 100% SOC (fully-charged) when charged at 0.2 CA (5-hour rate) for the negative electrode capacity, within the potential range of 0 to 1.5 V versus lithium; and then, obtaining SOC of the negative electrode based on this value. It should be noted that the lithium metal that was vapor-deposited on the surface of the negative electrode, was absorbed in the negative electrode even if the negative electrode was not immersed in an electrolyte, and thus, the negative electrode was charged (lithium was charged). Also, the amount of this charged lithium was equal to the charged quantity of electricity for charging up to 50% of the reversible capacity (50% SOC), in addition to the irreversible capacity of the negative electrode. The thickness of the negative electrode with 50% SOC was 9 μm. After SOC adjustment, the negative electrode stacking body was cut and punched out to be a disc shape having a diameter of 13.5 mm.

(3) Assembling of Electricity Storage Device

An electrode assembly was fabricated by placing opposite of one another, the positive electrode stacking body and the negative electrode stacking body both obtained above, with a separator (thickness of 20 μm) that was an electrolyte-impregnated microporous polyethylene sheet interposed therebetween. For the electrolyte, a non-aqueous electrolyte solution was used, the solution composed of a mixed solvent containing ethylene carbonate and ethyl methyl carbonate (volume ratio of 1:3) in which lithium hexafluorophosphate (supporting salt or electrolyte salt) was dissolved at a concentration of 1.25 mol/L. This electrode assembly was housed in a case, with the side of the positive electrode current collector being the bottom side. Then, the opening end portion of the case and the peripheral edge portion of a sealing plate was crimped together with a gasket interposed therebetween, thereby sealing the case, and thus, a coin-type electricity storage device of the present invention as shown in FIG. 1 was fabricated. It should be noted that a spacer having an appropriate thickness was provided between the negative electrode current collector and the sealing plate depending on the thickness of the positive electrode, when contact pressure was insufficient for each member in the electricity storage device.

Example 2

For a negative electrode current collector, a electrolytic copper foil (specific surface area of 11.6, arithmetic mean surface roughness (Ra) of 1.8 μm, thickness of 43 μm) was used. On this copper foil, a negative electrode (thickness of 1.5 μm, specific surface area of 11.4) composed of a thin silicon film was formed by means of RF sputtering. In this manner, a negative electrode stacking body composed of the negative electrode current collector and the negative electrode was obtained.

RF sputtering was performed as below. A molten silicon target (silicon purity of 99.99%) having a diameter of 10 inches was used; the distance between the target and a substrate was 7 cm; and argon was introduced at a flow rate of 50 sccm. The pressure in a vacuum atmosphere, the applied voltage, and the film-forming time were 1.1 Pa, 1 kW, and 5 hours, respectively.

As a result of confirming the negative electrode capacity in the same manner as Example 1, the reversible capacity capable of charging/discharging was 2.1 mAh (capacity per unit area: 1.5 mAh/cm$^2$) and the irreversible capacity not contributing to charging/discharging was 0.1 mAh.

In the present example, SOC of the negative electrode was adjusted to 50%, by forming a lithium metal layer having a thickness of 4 μm on the surface of the negative electrode obtained above, by means of vapor deposition. It should be noted that the lithium metal that was vapor-deposited on the surface of the negative electrode, was absorbed in the negative electrode even if the negative electrode was not immersed in an electrolyte, and thus, the negative electrode was charged (lithium was charged). Also, the amount of this charged lithium was equal to the charged quantity of electricity for charging up to 50% SOC, in addition to the irreversible capacity of the negative electrode. The negative electrode with 50% SOC obtained in this manner had a film thickness of 4 μm. Except for using this negative electrode stacking body composed of the negative electrode and the negative electrode current collector, an electricity storage device was fabricated in the same manner as Example 1.

Comparative Example 1

For a negative electrode active material, SiO particles (manufactured by Kojundo Chemical Laboratory Co., Ltd.) that were grounded and granulated by an automatic mortar to have a particle size of 44 μm or less were used. This negative electrode active material, graphite (an electron-conducting material), and polyacrylic acid (a binder) were mixed in a weight ratio of 45:40:15, respectively, and thus, a negative electrode material mixture was obtained. This negative electrode material mixture was pressure-bonded to a 100 μm-thick nickel mesh that was a negative electrode current collector, thereby forming a 75 μm-thick negative electrode (a material mixture layer).

With respect to the negative electrode obtained above, the capacity was confirmed as below and a charging process was performed by electrochemical charging. A coin-type electricity storage device was fabricated by placing opposite of one another: the negative electrode obtained above; and a counter electrode being lithium metal (thickness of 300 μm), with a separator (thickness of 20 μm) composed of a microporous polyethylene sheet interposed therebetween. Then, this electricity storage device was charged/discharged 3 times. At this time, the current value, the upper voltage limit, and the lower voltage limit were 0.5 mA, 1.5 V, and 0 V, respectively. It was confirmed that due to this charging/discharging, the reversible capacity capable of charging/discharging was 14 mAh and the irreversible capacity not contributing to charging/discharging was 9 mAh. After charging was performed up to 50% of the reversible capacity (50% SOC), the coin-type electricity storage device was disassembled, and a negative electrode stacking body composed of the negative electrode current collector and the negative electrode was taken out. Except for using this negative electrode stacking body, an electricity storage device was fabricated in the same manner as Example 1.

Comparative Example 2

Except for changing the negative electrode thickness from 75 μm to 50 μm, a 50 μm-thick negative electrode including a binder was formed on the surface of a nickel mesh (a negative electrode current collector) in the same manner as Comparative Example 1. With respect to the obtained negative electrode, the capacity was confirmed and a charging process was performed in the same manner as Comparative Example 1. It was confirmed that for the obtained negative electrode, the reversible capacity capable of charging/discharging was 9 mAh and the irreversible capacity not contributing to charging/discharging was 6 mAh. After charging was performed up to 50% of the reversible capacity (50% SOC), the coin-type electricity storage device was disassembled, and a negative electrode stacking body composed of the negative electrode current collector and the negative electrode was taken out. Except for using this negative electrode stacking body, an electricity storage device was fabricated in the same manner as Example 1.

Comparative Example 3

A charging process was performed by mechanical charging, on a negative electrode same as that of Comparative Example 2. That is, a 38 μm-thick Li metal layer was formed on the negative electrode, by means of vapor deposition. This layer included the amount of Li equal to the quantity of electricity capable of charging up to 50% SOC for the reversible capacity of the negative electrode, in addition to the irreversible capacity of the negative electrode. After Li was vapor-deposited, deposition of Li was confirmed due to the entire face of the negative electrode surface being silver-colored, and the charging reaction of Li at the negative electrode did not completely occur. In addition, when a negative electrode stacking body composed of this negative electrode and a negative electrode current collector was immersed in a non-aqueous electrolyte solution, the negative electrode peeled off from the negative electrode current collector, and thus, an evaluation as that for an electricity storage device could not be performed. It is considered that this was because the binder in the negative electrode degraded due to the vapor deposition of Li.

On the electricity storage devices of Examples 1 to 2 and Comparative Examples 1 to 2, a charge/discharge capacity evaluation was performed. It should be noted that, for the electricity storage devices of Examples 1 to 2 and Comparative Examples 1 to 2: the positive electrode capacity was 0.08 mAh; a negative electrode having a reversible capacity excessively sufficient in contrast to the positive electrode capacity was used; and the negative electrode capacity was sufficiently higher than the positive electrode capacity. Therefore, the theoretical charge/discharge capacity of these electricity storage devices was 0.08 mAh.

For the charge/discharge capacity evaluation, a constant-current charging/discharging was carried out at a current value of 0.5 mA, 4 mA, or 12 mA, with the upper charge voltage limit being 3.75 V, the lower discharge voltage limit being 2.75 V, and the charge rest time and the discharge rest time each being 1 minute. The charge rest time was the time after the end of charging until the start of next discharging. The discharge rest time was the time after the end of discharging until the start of next charging. This charging/discharging was repeated 3 times, and the discharge capacity at the $3^{rd}$ time was regarded as the charge/discharge capacity. The evaluation results are shown in Table 1.

TABLE 1

| Current Value | Negative Electrode | Charge/Discharge Capacity (mAh) | | |
|---|---|---|---|---|
| | | 0.5 mA | 4 mA | 12 mA |
| Example 1 | SiOx thin film | 0.09 | 0.08 | 0.05 |
| Example 2 | Si thin film | 0.09 | 0.08 | 0.07 |
| Comparative Example 1 | Material mixture layer | 0.08 | 0.05 | 0.01 |
| Comparative Example 2 | Material mixture layer | 0.08 | 0.06 | 0.02 |

From Table 1, the following became evident. In the electricity storage devices of Comparative Examples 1 and 2 which were conventional electricity storage devices, in the case of a small current value, being 0.5 mA, charging/discharging was possible until close to the theoretical capacity, being 0.08 mAh. However, a drop in charge/discharge capacity was seen as the current value rose from 0.5 mA to 4 mA, and then to 12 mA during charging/discharging. Particularly, the quantity of electricity for charging/discharging dropped drastically when the current value was 12 mA.

Compared to this, in the electricity storage devices of the present invention in Examples 1 and 2 using a negative electrode having a thickness of 10 μm or less formed directly on the negative electrode current collector without including a binder, it was confirmed that a large portion of the quantity of electricity for charging/discharging was able to be maintained. That is, an electricity storage device with higher output than the conventional one was able to be provided. In addition, in the electricity storage device of Comparative Example 3 using a negative electrode including an organic binder, lithium was unable to be absorbed in the negative electrode by means of vapor deposition in advance. In contrast, in the electricity storage devices of Examples 1 to 2, lithium was able to be absorbed in the negative electrode by means of vapor deposition before assembling, and therefore, excellence was found, also in the aspect of workability.

Compared to the electricity storage device of Example 1 (negative electrode thickness of 9 μm), that of Example 2 (negative electrode thickness of 4 μm) had a higher discharge capacity at a current value of 12 mA, and thus, an electricity storage device with higher output was able to be obtained. It is considered that this was due to the negative electrode thickness of the electricity storage device of Example 2 being 4 μm, thereby being thinner than the negative electrode thickness of the electricity storage device of Example 1. Therefore, it was found that the negative electrode thickness was preferably 5 μm or less.

The electricity storage devices of Examples 1 and 2 are capable of being charged/discharged at high voltages, with the operating voltage (lower discharge voltage limit to upper charge voltage limit) being 2.75 to 3.75 V, and therefore, is able to achieve a higher energy density than a conventional electricity storage device using an activated carbon for both of the positive electrode active material and the negative electrode active material. In addition, the negative electrode used in the electricity storage device of the present invention is a thin film having a thickness of 10 μm or less. Therefore, in the present invention, higher capacity and miniaturization can be achieved at the same time for an electricity storage device.

Example 3

Except for using a positive electrode stacking body as below, an electricity storage device was fabricated in the same manner as Example 1.

For a positive electrode active material to compose a positive electrode, an organic compound polymer (hereinafter referred to as "π-conjugated polymer") having a π-conjugated electron cloud that is a homopolymer having a monomer unit represented by a Chemical Formula (4) was used. This π-conjugated polymer was synthesized by a dehydration-condensation reaction between polyvinyl alcohol and a compound having a molecular construction represented by a Chemical Formula (5) in which a carboxyl group was introduced into tetrathiafulvalene. This π-conjugated polymer had a number average molecular weight of about 15,000 and a maximum theoretical capacity of 200 mAh/g.

[Chemical Formula 4]

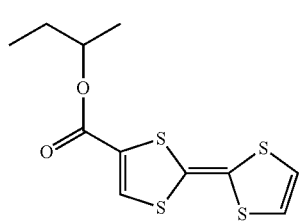

(4)

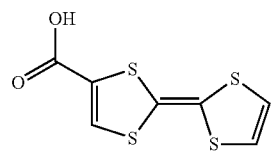

(5)

A positive electrode material mixture was prepared by uniformly mixing 37.5 mg of the π-conjugated polymer and 100 mg of acetylene black, and then additionally mixing 25 mg of polytetrafluoroethylene. This positive electrode material mixture was pressure-bonded onto a positive electrode current collector composed of an aluminum metal mesh, and then was vacuum-dried. This was cut and punched out to be a disc shape having a diameter of 13.5 mm, and thus, the stacking body composed of the positive electrode and the positive electrode current collector was fabricated. At this time, the weight of the positive electrode active material applied was 0.5 mg/cm$^2$ per unit area of the positive electrode, the positive electrode thickness was 90 μm, and the theoretical capacity of the positive electrode was 0.14 mAh.

Example 4

Except for using a positive electrode stacking body as below, an electricity storage device was fabricated in the same manner as Example 1.

For a positive electrode active material to compose a positive electrode, an organic compound polymer (hereinafter referred to as "radical polymer") having a radical that is a homopolymer having a monomer unit represented by a Chemical Formula (6) was used. This radical polymer was synthesized by radically polymerizing a monomer compound represented by a Chemical Formula (7), and then oxidizing a hydrogen atom bonded to a nitrogen atom. This radical polymer had a number average molecular weight of about 100,000 and a maximum theoretical capacity of 110 mAh/g.

[Chemical Formula 5]

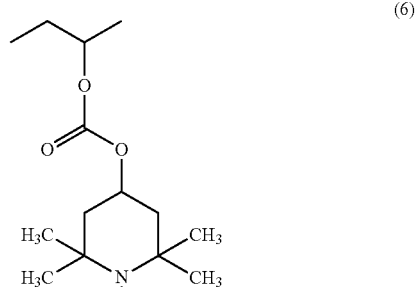

(6)

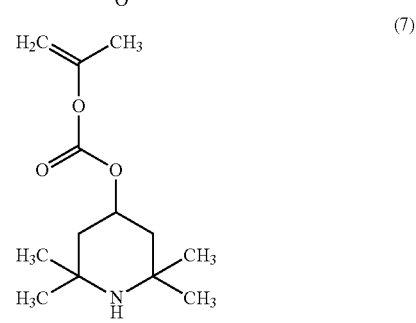

(7)

A positive electrode material mixture was prepared by uniformly mixing 37.5 mg of the radical polymer and 100 mg of acetylene black, and then additionally mixing 25 mg of polytetrafluoroethylene. This positive electrode material mixture was pressure-bonded onto a positive electrode current collector composed of an aluminum metal mesh, and then vacuum-dried. This was cut and punched to be a disc shape having a diameter of 13.5 mm, and thus, the stacking body composed of the positive electrode and the positive electrode current collector was fabricated. At this time, the weight of the positive electrode active material applied was 0.5 mg/cm² per unit area of the positive electrode, the positive electrode thickness was 90 μm, and the theoretical capacity of the positive electrode was 0.08 mAh.

On the electricity storage devices of Examples 3 to 4, a charge/discharge capacity evaluation was performed. For the charge/discharge capacity evaluation, a constant-current charging/discharging was performed at a current value of 0.5 mA, 4 mA, or 12 mA, with the upper charge voltage limit being V, the lower discharge voltage limit being 2.75 V, and the charge rest time and the discharge rest time each being 1 minute. The charge rest time was the time after the end of charging until the start of next discharging. The discharge rest time was the time after the end of discharging until the start of next charging. This charging/discharging was repeated 3 times, and the discharge capacity at the $3^{rd}$ time was regarded as the charge/discharge capacity. The evaluation results are shown in Table 2.

TABLE 2

| Current Value | Charge/Discharge Capacity (mAh) | | |
|---|---|---|---|
| | 0.5 mA | 4 mA | 12 mA |
| Example 3 | 0.15 | 0.14 | 0.12 |
| Example 4 | 0.09 | 0.08 | 0.05 |

From Table 2, the following became evident. In the electricity storage devices of Examples 3 and 4, it was confirmed that a large portion of the quantity of electricity for charging/discharging was able to be maintained, even if the current value rose from 0.5 mA to 4 mA, and then to 12 mA. That is, an electricity storage device having higher output than the conventional one was able to be provided. In addition, in the electricity storage devices of Examples 3 to 4, lithium was able to be absorbed in the negative electrode by means of vapor deposition before assembling, and therefore, excellence was found, also in the aspect of workability. From this result, it was confirmed that an electricity storage device having high output can be obtained, in the case of using an organic compound capable of being oxidized and reduced as the positive electrode active material.

In addition, since the organic compound capable of being oxidized and reduced that is the positive electrode active material has a higher capacity than an activated carbon and enables operation at high voltages, an electricity storage device with even higher capacity and practicality can be obtained.

Example 5

In the present example, the relation between the thickness of a negative electrode and the thickness of a positive electrode was studied.

The negative electrode was fabricated in the following manner.

For a negative electrode current collector, a copper foil (specific surface area of 11.6, surface roughness (Ra) of 2.0 μm, thickness of 43 μm) was used. A negative electrode (thickness of 6 μm, specific surface area of 4.2) composed of a thin film of a silicon oxide (SiOx) was formed on this copper foil, by means of electron beam heating vapor deposition.

In this manner, a negative electrode stacking body composed of the negative electrode current collector and the negative electrode was obtained. The negative electrode thickness was adjusted by adjusting the vapor deposition time. The conditions for electron beam heating vapor deposition were as follows. A silicon metal having a purity of 99.9999% (manufactured by Kojundo Chemical Laboratory Co., Ltd.) was used as a vapor deposition source, and the degree of vacuum was adjusted to $3 \times 10^{-3}$ Pa by introducing oxygen gas having a purity of 99.7% into a vacuum chamber. In addition, the acceleration voltage of the electron beam for irradiating the vapor deposition source was 8 kV and the emission was 500 mA. After forming the negative electrode, the composition was analyzed by fluorescent X-ray analysis, and as a result, the molar ratio of Si to O in the negative electrode was 1:0.6. From this, it was found that the value x of silicon oxide (SiOx) composing the negative electrode was 0.6.

Next, the capacity of the negative electrode obtained above was confirmed as below. A coin-type electricity storage device was fabricated by placing opposite of one another: a negative electrode stacking body fabricated in the same manner as above, cut and punched out to be a disc shape having a diameter of 13.5 mm; and a counter electrode composed of a lithium metal (thickness of 300 μm), with a separator (thickness of 20 μm) composed of a microporous polyethylene sheet interposed therebetween. This electricity storage device was charged/discharged 3 times. At this time, the current value, the upper voltage limit, and the lower voltage limit were 0.5 mA, 1.5 V, and 0 V, respectively. It was confirmed that due to this charging/discharging, the reversible capacity capable of charging/discharging was 1.8 mAh (capacity per unit area: 1.3 mAh/cm²), and the irreversible capacity not contributing to charging/discharging was 0.5 mAh.

Lastly, SOC of the negative electrode was adjusted in the following manner. That is, mechanical charging was performed on the negative electrode, and then, SOC of the negative electrode was finely adjusted by electrochemical charging. Specifically, a 2.6 μm-thick lithium metal equivalent to the irreversible capacity (0.5 mAh) was formed by means of vapor deposition, on the surface of the negative electrode in the negative electrode stacking body obtained above. It should be noted that lithium that was vapor-deposited on the surface of the negative electrode, was absorbed in the negative electrode even if the negative electrode was not immersed in an electrolyte, and thus, a capacity in an amount equal to the irreversible capacity was charged for the negative electrode. Further, a coin-type electricity storage device was fabricated by placing opposite of one another: the negative electrode stacking body after mechanical charging, that was cut and punched out to be a disc-shape having a diameter of 13.5 mm; and a counter electrode composed of lithium metal (thickness of 300 μm), with a separator interposed therebetween. Then, charging was performed at a constant current of 0.5 mA, until SOC of the negative electrode reached 50% (charged quantity of electricity: 0.05 mAh). It should be noted that the separator and the electrolyte used were the same as those used in Example 1.

In this manner, charging was performed until SOC of the negative electrode reached 50%, and then, the coin-type electricity storage device was disassembled, thereby obtaining a negative electrode having a 50% SOC. The thickness of the negative electrode obtained at this time was 9 μm.

Except for: making the active material weight per unit area and the electrode capacity of the positive electrode at the time of electricity storage device fabrication be the same values as those in Example 1; and changing the thickness of the positive electrode to the values shown in Table 3, positive electrode stacking bodies (A-1) to (A-7) were fabricated in the same manner as Example 1.

It should be noted that the thickness of the positive electrode of 45, 60, 70, 100, 125, 30, and 35 μm were adjusted by changing the mixing ratio of acetylene black as an auxiliary electron-conducting material relative to 100 mg of an activated carbon powder (specific surface area of 1700 m²/g, mean particle size of 2 μm) to 20, 30, 35, 50, 62, 15, and 18 mg, respectively.

Then, electricity storage devices (A-1) to (A-7) were fabricated in the same manner as Example 1, using the negative electrode stacking body obtained above and the positive electrode stacking bodies (A-1) to (A-7).

On the electricity storage devices (A-1) to (A-7), a charge/discharge capacity evaluation was performed.

For the charge/discharge capacity evaluation, a constant-current charging/discharging was performed at a current value of 4 mA or 12 mA, with the upper charge voltage limit being 3.75 V, the lower discharge voltage limit being 2.75 V, and the charge rest time after the end of charging until the start of next discharging and the discharge rest time after the end of discharging until the start of next charging, each being 1 minute. This charging/discharging was repeated 3 times, and the discharge capacity at the $3^{rd}$ time was regarded as the charge/discharge capacity.

These evaluation results are shown in Table 1. Also in Table 1, the thickness of the positive electrode and the negative electrode used per electricity storage device and their ratio are recorded.

TABLE 3

| Electricity Storage Device (Positive Electrode Stacking Body) No. | Thickness of Negative Electrode (μm) | Thickness of Positive Electrode (μm) | Charge/Discharge Capacity (mAh) Current Value 4 mA | Charge/Discharge Capacity (mAh) Current Value 12 mA | Thickness Ratio (Positive Electrode/Negative Electrode) |
|---|---|---|---|---|---|
| A-1 | 9 | 45 | 0.08 | 0.04 | 5.0 |
| A-2 | 9 | 60 | 0.08 | 0.04 | 6.7 |
| A-3 | 9 | 70 | 0.08 | 0.04 | 7.8 |
| A-4 | 9 | 100 | 0.08 | 0.06 | 11.1 |
| A-5 | 9 | 125 | 0.08 | 0.06 | 13.9 |
| A-6 | 9 | 30 | 0.05 | 0.01 | 3.3 |
| A-7 | 9 | 35 | 0.06 | 0.02 | 4.0 |

As shown in Table 3, when the electricity storage devices were charged/discharged at a current value of 4 mA, the electricity storage devices (A-1) to (A-5), whose thickness of the positive electrode was 5 or more times the thickness of the negative electrode, were able to obtain a capacity of 0.08 mAh, which was higher compared to the electricity storage devices (A-6) and (A-7), whose thickness of the positive electrode was less than 5 times the thickness of the negative electrode.

From the above, it was found that the thickness of the positive electrode was preferably 5 or more times the thickness of the negative electrode. It should be noted that the theoretical charge/discharge capacity of the electricity storage devices (A-1) to (A-8) was 0.08 mAh, since the positive electrode capacity was 0.08 mAh and the negative electrode capacity had a reversible capacity in an amount excessively sufficient in contrast to the positive electrode capacity.

In addition, when the electricity storage devices were charged/discharged at a current value of 12 mA, it was found that the electricity storage devices (A-4) and (A-5), whose thickness of the positive electrode was 10 or more times the thickness of the negative electrode, were able to obtain a capacity higher compared to the electricity storage devices of (A-1) to (A-3), (A-6) and (A-7), whose thickness of the positive electrode was less than 10 times the thickness of the negative electrode.

The fact that an electricity storage device is able to obtain high capacity even when charged/discharged at large currents, means that the electricity storage device has high capacity and excellent output characteristics. That is, it is considered that an electricity storage device having excellent ion conductivity and diffusibility can be provided, since sufficient amounts of anions and cations can be retained inside the electricity storage device.

From the above, it was found that the thickness of the positive electrode is preferably 10 or more times the thickness of the negative electrode.

Example 6

In the present example, the specific surface area of a negative electrode was studied.

Electricity storage devices (B-1) to (B-3) were fabricated in the same manner as Example 1, using negative electrode stacking bodies (B-1) to (B-3) as below.

The electricity storage device (B-1) was fabricated in the following manner.

For a negative electrode current collector, an electrolytic copper foil (specific surface area of 11.6, arithmetic mean surface roughness (Ra) of 1.8 μm, thickness of 43 μm) was used. On this copper foil, a negative electrode composed of a silicon thin film was formed by means of RF sputtering. In this manner, a negative electrode stacking body composed of the negative electrode current collector and the negative electrode was obtained.

RF sputtering was performed as below. A molten silicon target (silicon purity of 99%) having a diameter of 10 inches was used; the distance between the target and a substrate was 7 cm; and argon was introduced at a flow rate of 50 sccm. The pressure in a vacuum atmosphere, the applied voltage, and the film-forming time were 1.1 Pa, 1 kW, and 1 hour, respectively.

Figure 13:
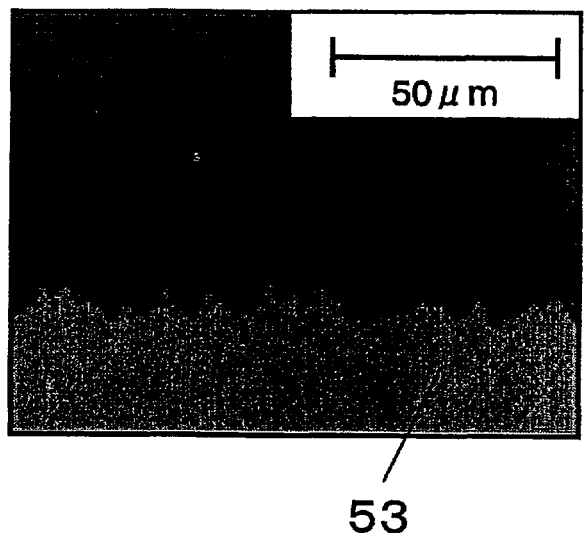
FIG. 13 is a microscope image of a cross-section in the thickness direction, of a negative electrode current collector 53 used in an electricity storage device (B-1) in Example 6 of the present invention.
Figure 14:
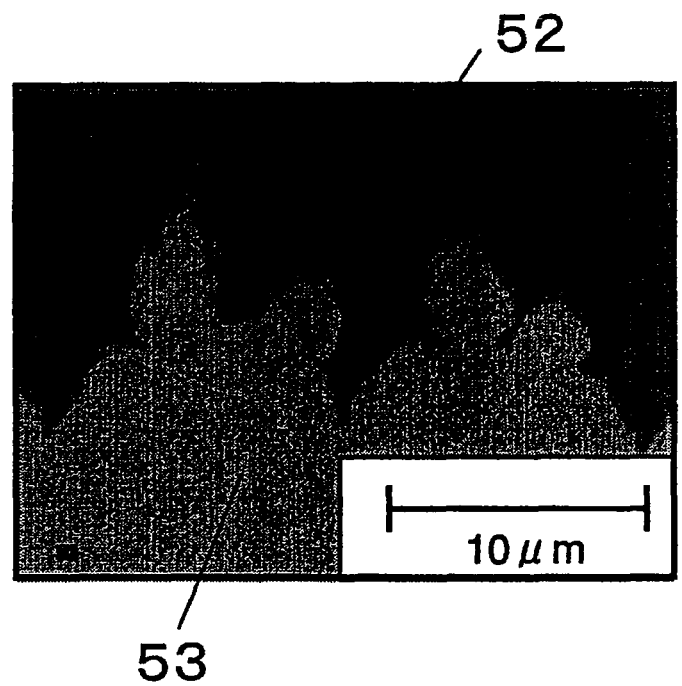
FIG. 14 is a microscope image of a cross-section in the thickness direction, of a negative electrode stacking body composed of a negative electrode 52 and the negative electrode current collector 53 used in the electricity storage device (B-1) in Example 6 of the present invention.

As a result of observing the obtained negative electrode by a scanning electron microscope (SEM), the negative electrode was a thin film having a thickness of 0.3 μm. FIG. 13 is a microscope image of a cross-section in the thickness direction, of a negative electrode current collector 53. FIG. 14 is a microscope image of a cross-section in the thickness direction, of a stacking body composed of a negative electrode 52 and the negative electrode current collector 53. From FIG. 14, it is evident that a thin film being the negative electrode 52 is formed on the surface (upper face) of an electrolytic copper foil being the negative electrode current collector 53, in a manner that follows the depressions and projections on the electrolytic copper foil surface. In addition, the specific surface area of the surface of the negative electrode 52 was 11.4. For the negative electrode 52, a value close to that of the specific surface area of the surface of the negative electrode current collector 53 was able to be obtained, since the depressions and projections on the surface of the negative electrode current collector 53 were nearly precisely reproduced on the surface of the negative electrode 52.

Next, the capacity of the negative electrode obtained above was confirmed as below. A coin-type electricity storage device was fabricated by placing opposite of one another: a negative electrode stacking body fabricated in the same manner as above, cut and punched out to be a disc shape having a diameter of 13.5 mm; and a counter electrode composed of a lithium metal plate (thickness of 300 μm), with a separator (thickness of 20 μm) composed of a microporous polyethylene sheet interposed therebetween. This electricity storage device was charged/discharged 3 times. At this time, the current value, the upper voltage limit, and the lower voltage limit were 0.1 mA, 1.5 V, and 0 V, respectively. It was confirmed that due to this charging/discharging, the reversible capacity capable of charging/discharging was 0.44 mAh/cm$^2$ and the irreversible capacity not contributing to charging/discharging was 0.03 mAh/cm$^2$.

Next, SOC of the negative electrode was adjusted to 50%. That is, a lithium metal layer having a thickness of 1.3 μm was formed on the surface of the negative electrode, by means of vapor deposition. This was cut and punched out to be a disc shape having a diameter of 13.5 mm, and thus, a stacking body composed of the lithium metal, the negative electrode, and the negative electrode current collector was formed. It should be noted that the lithium metal that was vapor-deposited on the surface of the negative electrode, was absorbed in the negative electrode even if the negative electrode was not immersed in an electrolyte, and thus, the negative electrode was charged (lithium was charged). In addition, the amount of this charged lithium was equal to the charged quantity of electricity for charging up 50% SOC, in addition to the irreversible capacity of the negative electrode. After SOC adjustment, the negative electrode thickness was 0.6 μm.

The negative electrode stacking body (B-2) was fabricated in the following manner.

For a negative electrode current collector, a rolled copper foil (specific surface area of 7.0, arithmetic mean surface roughness (Ra) of 1.24 μm, thickness of 15 μm) was used. On this copper foil, RF sputtering was performed under the same conditions as the above, and a negative electrode composed of a silicon thin film was formed. In this manner, a negative electrode stacking body composed of the negative electrode current collector and the negative electrode was obtained.

As a result of observing the obtained negative electrode by a scanning electron microscope (SEM), the negative electrode was a thin film having a thickness of 0.7 μm. The specific surface area of the negative electrode surface was 7.1. A value close to that of the specific surface area of the negative electrode current collector surface was able to be obtained, since the depressions and projections on the negative electrode current collector surface were nearly precisely reproduced on the negative electrode surface.

In addition, the capacity of the negative electrode was confirmed in the same manner as above, and as a result, it was confirmed that the reversible capacity capable of charging/discharging was 0.53 mAh/cm$^2$ and the irreversible capacity not contributing to charging/discharging was 0.04 mAh/cm$^2$.

Next, a lithium metal layer having a thickness of 1.6 μm was formed on the negative electrode surface by means of vapor deposition. Due to this, SOC of the negative electrode was adjusted to 50%. After SOC adjustment, the negative electrode thickness was 1.4 μm.

The negative electrode stacking body (B-3) was fabricated in the following manner.

For a negative electrode current collector, a rolled copper foil (specific surface area of 1.0, arithmetic mean surface roughness (Ra) of 0.12 μm, thickness of 15 μm) was used. On this copper foil, RF sputtering was performed under the same conditions as above, and a negative electrode composed of a silicon thin film was formed. In this manner, a negative electrode stacking body composed of the negative electrode current collector and the negative electrode was obtained.

Figure 15:
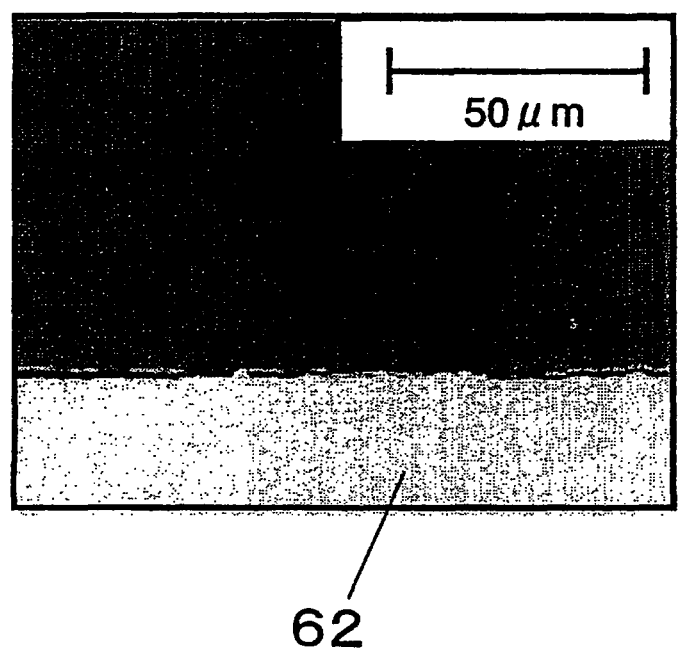
FIG. 15 is a microscope image of a cross-section in the thickness direction, of a negative electrode current collector 62 used in an electricity storage device (B-3) in Example 6 of the present invention.
Figure 16:
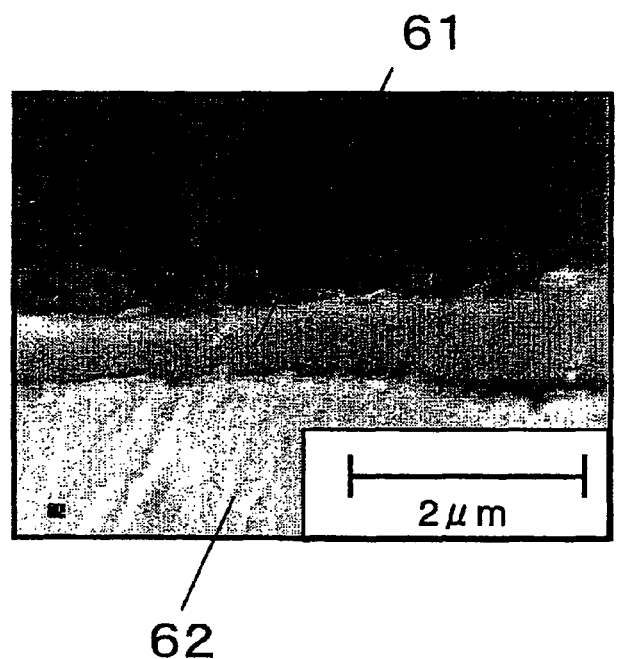
FIG. 16 is a microscope image of a cross-section in the thickness direction, of a negative electrode stacking body composed of a negative electrode 61 and the negative electrode current collector 62 used in the electricity storage device (B-3) in Example 6 of the present invention.

As a result of observing the obtained negative electrode by a scanning electron microscope (SEM), the negative electrode was a thin film having a thickness of 0.7 μm. FIG. 15 is a microscope image of a cross-section in the thickness direction, of a negative electrode current collector 62. FIG. 16 is a microscope image of a cross-section in the thickness direction, of a stacking body composed of a negative electrode 61 and the negative electrode current collector 62. From FIG. 16, it is evident that a thin film being the negative electrode 61 is formed on the surface of a rolled copper foil being the negative electrode current collector 62, in a manner that follows the depressions and projections on the rolled copper foil surface. In addition, the specific surface area of the surface of the negative electrode 61 was 1.1. For the negative electrode 61, a value close to that of the specific surface area of the surface of the negative electrode current collector 62 was able to be obtained, since the depressions and projections on the surface of the negative electrode current collector 62 were nearly precisely reproduced on the surface of the negative electrode 61.

In addition, the capacity of the negative electrode was confirmed in the same manner as above, and as a result, it was confirmed that the reversible capacity capable of charging/discharging was 0.53 mAh/cm$^2$ and the irreversible capacity not contributing to charging/discharging was 0.04 mAh/cm$^2$.

Next, a lithium metal layer having a thickness of 1.6 μm was formed on the negative electrode surface by means of vapor deposition. Due to this, SOC of the negative electrode was adjusted to 50%. After SOC adjustment, the negative electrode thickness was 1.4 μm.

On the electricity storage devices (B-1) to (B-3), a charge/discharge capacity evaluation was performed. In the electricity storage devices (B-1) to (B-3): the positive electrode capacity was 0.08 mAh; a negative electrode having a reversible capacity excessively sufficient in contrast to the positive electrode capacity was used; and the negative electrode capacity was sufficiently higher than the positive electrode capacity. Therefore the theoretical charge/discharge capacity of these electricity storage devices was 0.08 mAh.

For the charge/discharge capacity evaluation, a constant-current charging/discharging was performed at 0.6 mA, 1.8 mA, or 3 mA, with the upper charge voltage limit being 3.75 V, the lower discharge voltage limit being 2.75 V, and the charge rest time and the discharge rest time each being 1 minute. The charge rest time was the time after the end of charging until the start of next discharging. The discharge rest time was the time after the end of discharging until the start of next charging. This charging/discharging was repeated 3 times, and the discharge capacity at the 3$^{rd}$ time was regarded as the charge/discharge capacity. The results are shown in Table 4. It should be noted that the specific surface area of the negative electrode in each electricity storage device is also included in Table 4.

TABLE 4

| Electricity Storage Device | Charge/Discharge Capacity (mAh) | | | Specific Surface |
| --- | --- | --- | --- | --- |
| (Negative Electrode Stacking Body) No. | Current Value 0.6 mA | Current Value 1.8 mA | Current Value 3 mA | Area of Negative Electrode |
| B-1 | 0.08 | 0.08 | 0.07 | 11.4 |
| B-2 | 0.08 | 0.08 | 0.06 | 7.1 |
| B-3 | 0.08 | 0.06 | 0.03 | 1.1 |

As shown in Table 4, when the current value was 0.6 mA during charging/discharging, a capacity of 0.08 mAh, being the designed capacity, was able to be obtained for all of the electricity storage devices (B-1) to (B-3). In addition, even when the current value at the time of charging/discharging was large, being 1.8 mA or 3 mA, the electricity storage devices (B-1) and (B-2) exhibited capacities that were favorable, being nearly the same as the designed capacity. In particular, the electricity storage device (B-1) exhibited further favorable characteristics at a large current of 3 mA, compared to the electricity storage device (B-2).

The fact that the electricity storage devices (B-1) and (B-2) were able to obtain high capacities in this manner even when charged/discharged at a large current of 3 mA, means that these electricity storage devices have high capacity and excellent output characteristics.

The impedance of each electricity storage device was measured, and as a result, the resistance value of the electricity storage device (B-3) was 30 ohms greater than the resistance value of the electricity storage device (B-1). Since the constitution of the electricity storage device (B-1) was exactly the same as the electricity storage device (B-3) with the exception of the negative electrode, it was confirmed that the impedance of the electricity storage device lowered by enlarging the specific surface area of the negative electrode.

From the above result, it was found that the specific surface area of the negative electrode was preferably 5 or larger, when using a thin-film negative electrode: including a specific non-carbon material which is a negative electrode active material, with a large energy density; and having a thickness of 10 μm or less. Due to this, it was found that an electricity storage device having high capacity and excellent output characteristics, that is, a high-capacity capacitor could be obtained. Further, it was found that the specific surface area of the negative electrode is preferably 10 or larger, since output characteristics of the electricity storage device improves drastically.

Example 7

Except for using a positive electrode stacking body same as that of Example 3 in which the π-conjugated polymer as above was used for the positive electrode active material, an electricity storage device (B-4) was fabricated in the same manner as the electricity storage device (B-1) of Example 6.

In addition, except for using a positive electrode stacking body same as that of Example 4 in which the radical polymer as above was used for the positive electrode active material, an electricity storage device (B-5) was fabricated in the same manner as the electricity storage device (B-1) of Example 6.

On the electricity storage devices (B-4) and (B-5), a charge/discharge capacity evaluation was performed. The charge/discharge capacity evaluation was performed, with the charge/discharge current value, the upper charge voltage limit, and the lower discharge voltage limit being 4 mA, 4.2 V, and 2.75 V, respectively, and the charge rest time and the discharge rest time each being 1 minute. The charge rest time was the time after the end of charging until the start of next discharging. This charging/discharging was repeated 3 times, and the discharge capacity at the $3^{rd}$ time was regarded as the charge/discharge capacity.

The obtained charge/discharge capacities of the electricity storage device (B-4) and the electricity storage device (B-5) were 0.14 mAh and 0.08 mAh, respectively, and thus, high capacities in accordance with the designed capacity were able to be obtained. That is, in each case, an electricity storage device having high capacity and excellent output characteristics was able to be obtained, as in the case where an activated carbon was used for the positive electrode active material. In addition, an electricity storage device with even higher capacity and practicality were able to be obtained, since an organic compound capable of being oxidized and reduced as the positive electrode active material has a higher capacity compared to an activated carbon and enables operation at high voltages.

Example 8

In the present example, SOC of the negative electrode at the time of electricity storage device fabrication was studied.

For a negative electrode current collector, a copper foil (arithmetic mean surface roughness Ra=2.0 μm, thickness of 43 μm, specific surface area of 11.6) was used. On this copper foil, a negative electrode (thickness of 7 μm, specific surface area of 4.0) composed of a thin film of a silicon oxide (SiOx) was formed by means of electron beam heating vapor deposition. In this manner, a negative electrode stacking body composed of the negative electrode current collector and the negative electrode was obtained. The negative electrode thickness was adjusted by adjusting the vapor deposition time. The conditions for electron beam heating vapor deposition were as follows. A silicon metal having a purity of 99.9999% (manufactured by Kojundo Chemical Laboratory Co., Ltd.) was used as a vapor deposition source, and the degree of vacuum was adjusted to $3\times10^{-3}$ Pa by introducing oxygen gas having a purity of 99.7% into a vacuum chamber. In addition, the acceleration voltage of the electron beam for irradiating the vapor deposition source was 8 kV and the emission was 500 mA. After forming the negative electrode, the composition was analyzed by fluorescent X-ray analysis, and as a result, the ratio of Si to O in the negative electrode was Si:O=1:0.6 (molar ratio). From this, it was found that the value x of silicon oxide (SiOx) composing the negative electrode was 0.6.

Next, the capacity of the negative electrode obtained above was confirmed as below. A coin-type electricity storage device was fabricated by placing opposite of one another: a negative electrode stacking body fabricated in the same manner as above, cut and punched out to be a disc shape having a diameter of 13.5 mm; and a counter electrode composed of a lithium metal plate (thickness of 300 μm), with a separator (thickness of 20 μm) composed of a microporous polyethylene sheet interposed therebetween. This electricity storage device was charged/discharged 3 times. At this time, the current value, the upper voltage limit, and the lower voltage limit were 0.5 mA, 1.5 V, and 0 V, respectively. It was confirmed that due to this charging/discharging, the reversible capacity capable of charging/discharging was 2.1 mAh (negative electrode capacity per unit area: 1.5 mAh/cm$^2$) and the irreversible capacity not contributing to charging/discharging was 0.5 mAh.

In the present example, mechanical charging was performed on the negative electrode, and then, SOC of the negative electrode was adjusted by electrochemical charging. The negative electrode SOC was obtained in the same manner as Example 1.

Specifically, a lithium metal layer having a thickness of 3 μm equivalent to the irreversible capacity (0.6 mAh) was formed on the surface of the negative electrode in the negative electrode stacking body obtained above by means of vapor deposition. It should be noted that lithium metal that was vapor-deposited on the surface of the negative electrode, was absorbed in the negative electrode even if the negative electrode was not immersed in an electrolyte, and thus, the negative electrode was charged (lithium was charged), the charged amount being equal to the amount of the irreversible capacity.

Further, a coin-type electricity storage device was fabricated by placing opposite of one another: the negative electrode stacking body after mechanical charging, that was cut and punched out to be a disc-shape having a diameter of 13.5 mm; and a counter electrode composed of a lithium metal plate (thickness of 300 µm), with a separator interposed therebetween.

Then, charging was performed at a constant current of 0.5 mA for a predetermined time, so that SOC of the negative electrode became the values shown in Table 5. Specifically, the charging time was adjusted and SOC of the negative electrode was changed to 20%, 40%, 50%, 70%, 80%, 90%, 0%, or 10%, thereby obtaining negative electrodes (C-1) to (C-8), respectively. It should be noted that the quantity of electricity for charging so as to make SOC of the negative electrode be 20%, 40%, 50%, 70%, 80%, 90%, 0%, or 10%, were 0.42 mAh, 0.84 mAh, 1.05 mAh, 1.47 mAh, 1.68 mAh, 1.89 mAh, 0 mAh, or 0.21 mAh, respectively. In addition, the thickness of the negative electrodes (C-1) to (C-8) after SOC adjustment as above, were 6.8 µm, 7.6 µm, 8.1 µm, 8.7 µm, 9.2 µm, 9.6 µm, 6.0 µm, and 6.5 µm, respectively, and thus, all were 10 µm or less. It should be noted that the separator and the electrolyte used were the same as those of the electricity storage device of Example 1.

In addition, except for using a negative electrode stacking body including a negative electrode (thickness of 7 µm) whose SOC was not adjusted (mechanical charging and electrochemical charging were not performed on the negative electrode), an electricity storage device (C-9) was fabricated in the same manner as Example 1. It should be noted that SOC of the negative electrode at the time of electricity storage device fabrication was −30% for convenience, since this negative electrode did not undergo a charging process for an amount of capacity that was equal to: the amount of irreversible capacity equivalent to 30% of the reversible capacity.

Except for using the negative electrode stacking bodies (C-1) to (C-9) as above, electricity storage devices (C-1) to (C-9) were fabricated in the same manner as Example 1.

On the electricity storage devices (C-1) to (C-9), a charge/discharge capacity evaluation and an impedance evaluation were performed. For the charge/discharge capacity evaluation, a constant-current charging/discharging was performed at a current value of 4 mA, with the upper charge voltage limit being 3.75 V, the lower discharge voltage limit being 2.75 V, and the charge rest time and the discharge rest time each being 1 minute. The charge rest time was the time after the end of charging until the start of next discharging. This charging/discharging was repeated 3 times, and the discharge capacity at the $3^{rd}$ time was regarded as the charge/discharge capacity.

In addition, the impedance evaluation was performed at a discharged state after the end of the charge/discharge capacity evaluation, by using an A/C impedance method. The evaluation was performed under the measurement conditions of: the measurement performed within a frequency range of $10^6$ to 0.1 Hz, with the amplitude set to 10 mV starting from the open circuit voltage; and an impedance value read at a frequency of 10 Hz.

It should be noted that impedance of an electricity storage device referred to here, is an indication that makes known the output characteristics of an electricity storage device. For example, when impedance of the electricity storage device is small, the electricity storage device is in a state of low resistance, thereby having high output characteristics, and when impedance is large, the electricity storage device is in a state of high resistance, thereby not having high output characteristics.

The evaluation results of the above are shown in Table 5. It should be noted that: SOC (%) of the negative electrode at the time of device fabrication (in a discharged state immediately after fabrication); and SOC (%) of the negative electrode in a charged state, are also shown in Table 5.

TABLE 5

| Electricity Storage Device (Negative Electrode) No. | Negative Electrode SOC (%) at the time of Electricity Storage Device Fabrication (in Discharged State) | Negative Electrode SOC (%) of Electricity Storage Device in Charged State | Charge/Discharge Capacity of Electricity Storage Device (mAh) | Impedance of Electricity Storage Device (Ω) |
| --- | --- | --- | --- | --- |
| C-1 | 20  | 24 | 0.09 | 5.0 |
| C-2 | 40  | 45 | 0.10 | 4.4 |
| C-3 | 50  | 55 | 0.10 | 4.4 |
| C-4 | 70  | 75 | 0.10 | 4.8 |
| C-5 | 80  | 85 | 0.10 | 5.1 |
| C-6 | 90  | 95 | 0.10 | 6.2 |
| C-7 | 0   | 4  | 0.08 | 52.8 |
| C-8 | 10  | 14 | 0.09 | 10.0 |
| C-9 | −30 | —  | 0    | — |

As shown in Table 5, the electricity storage devices (C-1) to (C-8) exhibited charge/discharge capacities ranging from 0.08 to 0.10 mAh, and thus, their operations as an electricity storage device were able to be confirmed. The voltages of these electricity storage devices during charging/discharging ranged from 2.75 to 3.75 V, and thus, being around 3 V or higher, voltages higher compared to a conventional electric double layer capacitor were able to be obtained. That is, electricity storage devices capable of operating at high voltages and having high capacities were able to be obtained.

For the electricity storage device (C-9), a charge/discharge capacity was not able to be obtained. This is considered to be due to the irreversible capacity of the negative electrode. That is, it is considered that a part of the charged quantity of electricity immediately after fabrication was consumed as the irreversible capacity of the negative electrode, and thus, discharging was not able to be performed. It should be noted that for all of the electricity storage devices (C-1) to (C-8), favorable charge/discharge capacities were able to be obtained, since the charging process for the amount equal to the irreversible capacity of the negative electrode, was performed in advance during the process of adjusting SOC of the negative electrode.

In addition, due to the irreversible capacity of the negative electrode in the electricity storage device being 2.1 mAh, the utilization rate of the negative electrode active material was 4 to 5%, that is, the difference between the negative electrode SOC during charging and that during discharging was 4 to 5% in the electricity storage device. From this, it was found that a high-capacity electricity storage device that operates at a voltage of about 3 V or higher, the operating voltage being 2.75 to 3.75 V, can be obtained when the negative electrode SOC used for the electricity storage device is 0 to 95%.

In addition, from the results of Table 5, it was found that impedance of the electricity storage device depended heavily on SOC of the negative electrode. For the electricity storage devices (C-1) to (C-6) in which the negative electrode SOC was 20 to 95% during charging/discharging, impedance dropped to 6.2Ω or lower. In contrast to this, for the electricity storage devices (C-7) and (C-8) in which the negative electrode SOC was 20% or lower, impedance rose to 10Ω or higher. From this result, it was found that impedance was small when the negative electrode SOC in the electricity storage device was 20 to 95%, thereby being able to obtain an electricity storage device having high output. It should be noted that impedance was not measured for the electricity storage device (C-9) in which a charge/discharge capacity could not be confirmed.

Next, a repeated charge/discharge test was performed by using the electricity storage devices (C-1), (C-3), (C-6), and (C-8). For the charging/discharging conditions, the charge/discharge current, the upper charge voltage limit, and the lower discharge voltage limit were 4 mA, 3.75 V, and 2.75 V, respectively. In addition, the charge rest time after the end of charging until the start of next discharging and the discharge rest time after the end of discharging until the start of next charging were 1 minute each. In this manner, charging/discharging was repeated 500 times. This charge/discharge test was repeated 6 times, that is, the test was repeated up to a total of 3,000 cycles.

In the repeated test as above, for every 500 cycles of charging/discharging repeated, charging/discharging was performed 3 times under the same conditions as above except for making the charge/discharge current value be 0.5 mA, and the discharge capacity at the $3^{rd}$ time was obtained.

Figure 17:
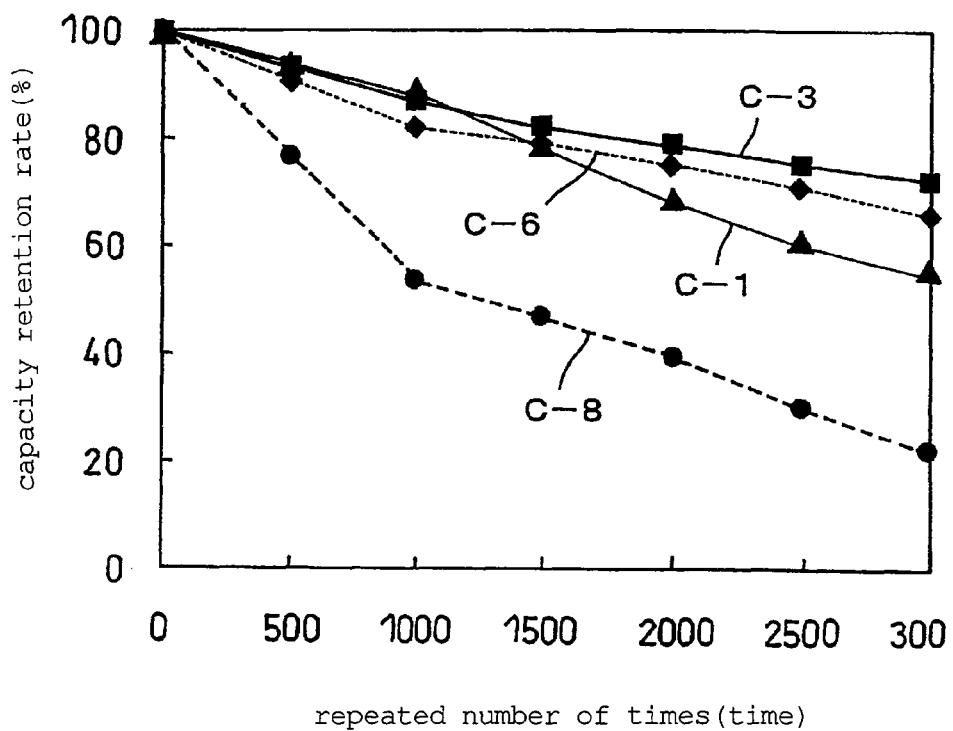
FIG. 17 is a diagram showing the repeated charge/discharge test results for electricity storage devices (C-1), (C-3), (C-6), and (C-8) in Example 8 of the present invention.

The results of this repeated test are shown in FIG. 17. The capacity retention rates in FIG. 17 express as percentage, the ratio of the discharge capacity obtained at each cycle relative to the initial discharge capacity. From FIG. 17, it was found that repeated charge/discharge characteristics of an electricity storage device depend heavily on the negative electrode SOC of the electricity storage device. Specifically, it was found that: for the electricity storage devices (C-1), (C-3), and (C-6) in which the negative electrode SOC during charging/discharging is within the range of 20 to 95%, the capacity retention rate is 50% or higher at the point where the number of cycles is 3,000; and in contrast, for the electricity storage device (C-8) in which the negative electrode SOC during charging/discharging is 10%, the capacity retention rate drops to 20% at the point where the number of cycles is 3,000, thereby causing the repeated characteristics to degrade.

From the results as above, it was found that the negative electrode SOC in the electricity storage device during charging/discharging is preferably 20 to 95%, since an electricity storage device having high capacity as well as excellent output characteristics and repeated charge/discharge characteristics can be obtained.

Example 9

Except for using a positive electrode stacking body same as that of Example 3 in which the π-conjugated polymer as above was used for the positive electrode active material, an electricity storage device (C-10) was fabricated in the same manner as the electricity storage device (C-3) of Example 11.

In addition, except for using a positive electrode stacking body same as that of Example 4 in which the radical polymer as above was used for the positive electrode active material, an electricity storage device (C-11) was fabricated in the same manner as the electricity storage device (C-3) of Example 11.

On the electricity storage devices (C-10) and (C-11), a charge/discharge capacity evaluation was performed as follows. For the charging/discharging conditions, the charge/discharge current value, the upper charge voltage limit, and the lower discharge voltage limit were 4 mA, 4.2 V, and 2.75 V, respectively, and the charge rest time after the end of charging until the start of next discharging and the discharge rest time after the end of discharging until the start of next charging were 1 minute each. This charging/discharging was repeated 3 times, and the discharge capacity at the $3^{rd}$ time was regarded as the charge/discharge capacity. The evaluation results are shown in Table 6, along with the results of the electricity storage device (C-3).

TABLE 6

| Electricity Storage Device No. | Negative Electrode SOC (%) at the time of Electricity Storage Device Fabrication (in Discharged State) | Negative Electrode SOC (%) of Electricity Storage Device in Charged State | Charge/Discharge Capacity of Electricity Storage Device (mAh) |
|---|---|---|---|
| C-3 | 50 | 55 | 0.10 |
| C-10 | 50 | 70 | 0.40 |
| C-11 | 50 | 60 | 0.22 |

For the electricity storage devices (C-10) and (C-11), capacities higher compared to the electricity storage device (C-3) were obtained. These electricity storage devices had voltages around 3 V or higher during charging/discharging, being 2.75 to 4.2 V, and thus, were found to operate at high voltages.

For the electricity storage devices (C-10) and (C-11), high capacities as well as excellent output characteristics and repeated charge/discharge characteristics were obtained, as with when an activated carbon was used for the positive electrode active material. It should be noted that for the electricity storage devices (C-10) and (C-11), although charging/discharging was performed with the negative electrode SOC being within the range of 50 to 70%, the same results as the above can be obtained as long as the negative electrode SOC is within the range of 20 to 95%.

Example 10

In the present example, the form of a negative electrode current collector was studied.

On the negative electrode current collector in layer form, a negative electrode (thickness of 3.0 μm) composed of a silicon oxide (SiOx) thin film was formed by means of electron beam heating vapor deposition. The negative electrode thickness was adjusted by adjusting the vapor deposition time. The conditions for electron beam heating vapor deposition were as follows. A silicon metal having a purity of 99.9999% (manufactured by Kojundo Chemical Laboratory Co., Ltd.) was used as a vapor deposition source, and the degree of vacuum was adjusted to $3 \times 10^{-3}$ Pa by introducing oxygen gas having a purity of 99.7% into a vacuum chamber. In addition, the acceleration voltage of the electron beam for irradiating the vapor deposition source was 8 kV and the emission was 500 mA. After forming the negative electrode, the composition was analyzed by fluorescent X-ray analysis, and as a result, the ratio of Si to O in the negative electrode was Si:O=1:0.6 (molar ratio). From this, it was found that the value x of silicon oxide (SiOx) composing the negative electrode was 0.6.

Next, the capacity of the negative electrode obtained above was confirmed as below. A coin-type electricity storage device was fabricated by placing opposite of one another: a negative electrode fabricated in the same manner as above; and a counter electrode composed of a lithium metal (thickness of 300 μm), with a separator (thickness of 20 μm) composed of a microporous polyethylene sheet interposed therebetween. This electricity storage device was charged/discharged 3 times. At this time, the current value, the upper voltage limit, and the lower voltage limit were 0.1 mA, 1.5 V, and 0 V, respectively. According to this charging/discharging, the reversible capacity capable of charging/discharging was 0.72 mAh/cm$^2$ and the irreversible capacity not contributing to charging/discharging was 0.22 mAh/cm$^2$.

The negative electrode obtained above was in a completely-discharged state, that is, was 0% SOC, since the negative electrode active material in the negative electrode immediately after fabrication did not include lithium. SOC of the negative electrode is an indication showing the charged state, not of the entire electricity storage device, but of a single negative electrode, and is a value expressing as percentage, the ratio of the charged amount relative to the fully-charged amount, with the capacity of the single negative electrode being 100% when fully-charged. Therefore, SOC of a completely-discharged state is 0% and SOC of a fully-charged state is 100%. It should be noted that SOC of the negative electrode can be obtained by the following manner. The SOC value can be obtained by: defining that SOC is 100% (is at a fully-charged state) for the charged amount of the negative electrode when charged at 0.2 CA (5-hour rate) for a negative electrode capacity, within the potential range of 0 to 1.5 V versus lithium; and then, obtaining the SOC value based on this charged amount.

In the present example, SOC of the negative electrode was adjusted to 50%, by forming a lithium metal layer having a thickness of 3.0 μm on the surface of the negative electrode obtained above, by means of vapor deposition. It should be noted that the lithium metal that was vapor-deposited on the surface of the negative electrode, was absorbed in the negative electrode even if the negative electrode was not immersed in an electrolyte, and thus, the negative electrode was charged (lithium was charged). Also, the amount of this charged lithium was equal to the quantity of electricity for charging up to 50% SOC, in addition to the irreversible capacity of the negative electrode. The negative electrode with 50% SOC obtained in this manner had a film thickness of 4.5 μm.

Except for using the negative electrode stacking body as above, an electricity storage device was fabricated in the same manner as Example 1. Also, when fabricating the negative electrode stacking body as above, negative electrode current collectors (D-1) to (D-7) were used, each being as follows.

For the negative electrode current collector (D-1), a copper foil (specific surface area of 1.4) having projections on the surface thereof was used. This negative electrode current collector was fabricated by pattern plating a rolled copper foil. For the pattern plating: a negative-type photoresist was applied on the rolled copper foil having a thickness of 20 μm; then, the resist film on the copper foil was exposed and developed, with the use of a negative-type mask placed so that the 10 μm-square pattern occupies 92% of the copper foil surface; further, on the formed grooves, copper particles were deposited by means of electrolysis; and finally, the resist was removed and thus, the copper foil having trapezoid-shaped projections on the surface thereof was obtained.

Figure 18:
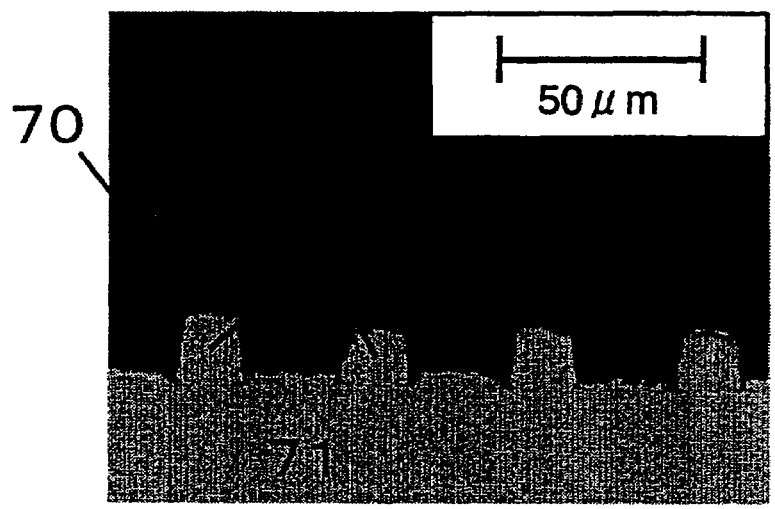
FIG. 18 is an electron microscope image showing an essential part of a cross-section in the thickness direction, of a negative electrode current collector 70 used in an electricity storage device (D-1) of Example 10 of the present invention.

Here, FIG. 18 is a scanning electron microscope (SEM) image of an essential part of a cross-section in the thickness direction, of a negative electrode current collector 70 being the negative electrode current collector (D-1). The negative electrode current collector 70 is composed of: a current-collecting film 71 being a rolled copper foil; and a plurality of projections 72 formed on the surface of the current-collecting film 71. Projections 72 were formed on both faces of the current-collecting film 71, each face facing the thickness direction. The cross-section of the projection 72 in the thickness direction was shaped as a pseudo-trapezoid, and the height of the projection 72 was 15 μm. In addition: the thickness of the negative electrode current collector 70 including the projection 72 was 50 μm; the area occupied by projections 72 on the surface of the current-collecting film 71 was 8%; and the volume ratio of the electrolyte retention portion relative to the volume occupied by the negative electrode current collector 70 was 55%. Here, the area occupied by projections 72 is the percentage of: the total area of the part where projections 72 were formed on the surface of the negative electrode current collector 70; relative to the area of the surface of the negative electrode current collector 70.

The height of the projection 72 and the thickness of the negative electrode current collector 70 were measured by a cross-sectional electron microscopic observation of the current collector. In addition, the area occupied by projections 72 on the surface of the current-collecting film 71 was measured by a surface electron microscopic observation of the current collector. By using these values, the volume ratio of the electrolyte retention portion relative to the volume occupied by the negative electrode current collector 70 was obtained.

For the negative electrode current collector (D-2), a copper foil (specific surface area of 1.4) having a plurality of projections on both faces thereof was used, each face facing the thickness direction. This negative electrode current collector was fabricated by pattern plating the rolled copper foil. For the pattern plating: a negative-type photoresist was applied on the rolled copper foil having a thickness of 20 μm; then, the resist film on the copper foil was exposed and developed, with the use of a negative-type mask placed so that the 10 μm-square pattern occupies 85% of the copper foil surface; further, on the formed grooves, copper particles were deposited by means of electrolysis; and finally, the resist was removed and thus, the copper foil having trapezoid-shaped projections on the surface thereof was obtained. The cross-section of the projection in the thickness direction was shaped as a pseudo-trapezoid, and the height of the projection was 15 μm. In addition: the thickness of the negative electrode current collector including the projection was 50 μm; the area occupied by the projections on the current-collecting film surface was 15%; and the volume ratio of the electrolyte retention portion relative to the volume occupied by the negative electrode current collector was 51%.

For the negative electrode current collector (D-3), a copper foil (specific surface area of 1.4) having a plurality of projections on both faces thereof was used, each face facing the thickness direction. This negative electrode current collector was fabricated by pattern plating the rolled copper foil. For the pattern plating: a negative-type photoresist was applied on the rolled copper foil having a thickness of 18 μm; then, the resist film on the copper foil was exposed and developed, with the use of a negative-type mask placed so that the 10 μm-square pattern occupies 85% of the copper foil surface; further, on the formed grooves, copper particles were deposited by means of electrolysis; and finally, the resist was removed and thus, the copper foil having trapezoid-shaped projections on the surface thereof was obtained. The cross-section of the projection in the thickness direction was shaped as a pseudo-trapezoid, and the height of the projection was 12 μm. In addition: the thickness of the negative electrode current collector including the projection was 42 μm; the area occupied by the projections on the current-collecting film surface was 15%; and the volume ratio of the electrolyte retention portion relative to the volume occupied by the negative electrode current collector was 49%.

For the negative electrode current collector (D-4), a copper foil (specific surface area of 1.4) having a plurality of projections on both faces thereof was used, each face facing the thickness direction. This negative electrode current collector was fabricated by pattern plating the rolled copper foil. For the pattern plating: a negative-type photoresist was applied on the rolled copper foil having a thickness of 22 μm; then, the resist film on the copper foil was exposed and developed, with the use of a negative-type mask placed so that the 10 μm-square pattern occupies 92% of the copper foil surface; further, on the formed grooves, copper particles were deposited by means of electrolysis; and finally, the resist was removed and thus, the copper foil having trapezoid-shaped projections on the surface thereof was obtained. The cross-section of the projection in the thickness direction was shaped as a pseudo-trapezoid, and the height of the projection was 10 μm. In addition: the thickness of the negative electrode current collector including the projection was 42 μm; the area occupied by the projections on the current-collecting film surface was 8%; and the volume ratio of the electrolyte retention portion relative to the volume occupied by the negative electrode current collector was 44%.

For the negative electrode current collector (D-5), a foamed metal composed of copper (thickness of 200 μm, average pore diameter of 100 μm, porosity (volume ratio of the electrolyte retention portion relative to the volume occupied by the negative electrode current collector) of 80%, manufactured by Mitsubishi Materials Corporation) was used.

Figure 19:
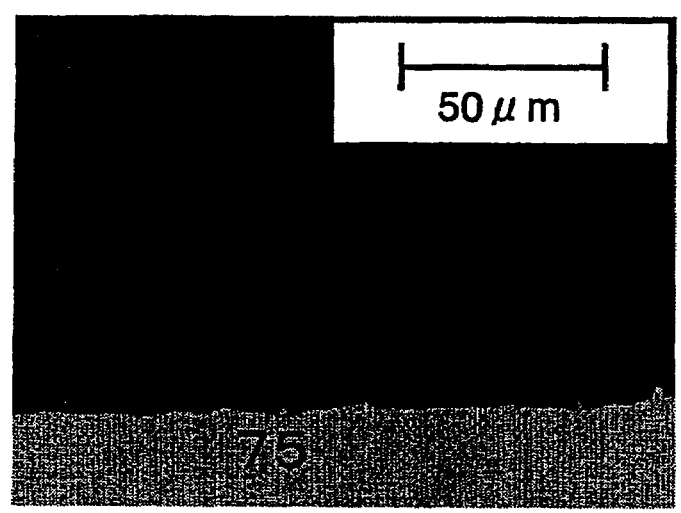
FIG. 19 is an electron microscopic image showing an essential part of a cross-section in the thickness direction, of a negative electrode current collector 75 used in an electricity storage device (D-6) in Example 10 of the present invention.

For the negative electrode current collector (D-6), a rolled copper foil (arithmetic mean surface roughness (Ra) of 0.12 μm, thickness of 25 μm, specific surface area of 1.0) having a smooth surface was used. Here, FIG. 19 is a scanning electron microscopic (SEM) image of an essential part of a cross-section in the thickness direction, of a negative electrode current collector 75 being the negative electrode current collector (D-6). The negative electrode current collector 75 does not have projections on the surface facing the thickness direction, and also does not have through-holes that penetrate in the thickness direction. Therefore, the volume ratio of the electrolyte retention portion relative to the volume occupied by the negative electrode current collector 75 is 0%. It should be noted that the specific surface area of the negative electrode in the case of using the negative electrode current collector (D-6) was 1.1.

For the negative electrode current collector (D-7), a copper foil (specific surface area of 1.4) having a plurality of projections on both faces thereof was used, each face facing the thickness direction. This negative electrode current collector was fabricated by pattern plating the rolled copper foil. For the pattern plating: a negative-type photoresist was applied on the rolled copper foil having a thickness of 26 μm; then, the resist film on the copper foil was exposed and developed, with the use of a negative-type mask placed so that the 10 μm-square pattern occupies 70% of the copper foil surface; further, on the formed grooves, copper particles were deposited by means of electrolysis; and finally, the resist was removed and thus, the copper foil having trapezoid-shaped projections on the surface thereof was obtained. The cross-section of the projection in the thickness direction was shaped as a pseudo-trapezoid, and the height of the projection was 8 μm. In addition: the thickness of the negative electrode current collector including the projection was 42 μm; the area occupied by the projections on the current-collecting film surface was 30%; and the volume ratio of the electrolyte retention portion relative to the volume occupied by the negative electrode current collector was 27%.

Using the negative electrode current collectors (D-1) to (D-7) as above, electricity storage devices (D-1) to (D-7) were fabricated, respectively.

On the electricity storage devices (D-1) to (D-7), a charge/discharge capacity evaluation was performed. It should be noted that for the electricity storage devices (D-1) to (D-7): the positive electrode capacity was 0.08 mAh; a negative electrode having a reversible capacity excessively sufficient in contrast to the positive electrode capacity was used; and the negative electrode capacity was sufficiently higher than the positive electrode capacity. Therefore, the theoretical charge/discharge capacity of these electricity storage devices was 0.08 mAh.

For the charge/discharge capacity evaluation, a constant-current charging/discharging was performed at a current value of 4 mA, with the upper charge voltage limit being 3.75 V, the lower discharge voltage limit being 2.75 V, and the charge rest time and the discharge rest time each being 1 minute. The charge rest time was the time after the end of charging until the start of next discharging. The discharge rest time was the time after the end of discharging until the start of next charging. This charging/discharging was repeated 3 times, and the discharge capacity at the $3^{rd}$ time was regarded as the charge/discharge capacity. The evaluation results are shown in Table 7. It should be noted that in Table 7, for each electricity storage device, the characteristics of the negative electrode current collector and the ratio of: the projection height or the through-hole diameter of the negative electrode current collector; to the negative electrode film thickness (4.5 μm) (projection height/negative electrode film thickness, or through-hole diameter/negative electrode film thickness) are also included.

TABLE 7

| Electricity Storage Device (Negative Electrode Stacking Body) No. | Charge/ Discharge Capacity (mAh) | Negative Electrode Current Collector Characteristics | | | | Projection Height/ Negative Electrode Film Thickness | Through-hole Diameter/ Negative Electrode Film Thickness |
|---|---|---|---|---|---|---|---|
| | | Volume Ratio of Electrolyte Retention Portion (%) | Thickness (μm) | Projection Height (μm) | Through-hole Diameter (μm) | | |
| D-1 | 0.08 | 55 | 50 | 15 | — | 3.3 | — |
| D-2 | 0.08 | 51 | 50 | 15 | — | 3.3 | — |

TABLE 7-continued

| Electricity Storage Device (Negative Electrode Stacking Body) No. | Charge/ Discharge Capacity (mAh) | Negative Electrode Current Collector Characteristics | | | | Through- hole Diameter/ Negative Electrode Film Thickness |
|---|---|---|---|---|---|---|
| | | Volume Ratio of Electrolyte Retention Portion (%) | Thickness (μm) | Projection Height (μm) | Through- hole Diameter (μm) | Projection Height/ Negative Electrode Film Thickness |
| D-3 | 0.08 | 49 | 42 | 12 | — | 2.7 | — |
| D-4 | 0.08 | 44 | 42 | 10 | — | 2.2 | — |
| D-5 | 0.08 | 80 | 200 | — | 100 | — | 22.2 |
| D-6 | 0.05 | 0 | 25 | — | — | — | — |
| D-7 | 0.06 | 27 | 42 | 8 | — | 1.8 | — |

For the electricity storage devices (D-1) to (D-4), the volume ratio of the electrolyte retention portion relative to the volume occupied by the negative electrode current collector was high, being 44 to 55%, and thus, an electrolyte was able to be retained on the negative electrode current collector surface. Due to this, high discharge capacities in accordance with the design value were obtained for the electricity storage devices (D-1) to (D-4).

Also, for the electricity storage device (D-5) in which the negative electrode current collector (D-5) composed of a microporous film having through-holes in the thickness direction was used, the effect of electrolyte retention was sufficiently exhibited by the negative electrode current collector, and thus, high capacity was obtained. Even among all the negative electrode current collectors in Table 7, it was found that the negative electrode current collector (D-5) had the highest volume ratio of the electrolyte retention portion relative to the volume occupied by the negative electrode current collector, the ratio being 80%, and thus, had the most excellent electrolyte retention characteristics.

In the electricity storage device (D-6) in which a non-porous copper foil having a smooth surface was used for the negative electrode current collector, since the effect of electrolyte retention exhibited by the negative electrode current collector was nearly 0, the discharge capacity dropped, being 0.05 mAh.

Compared to the negative electrode current collectors (D-1) to (D-4), the negative electrode current collector (D-7) had a low volume ratio of the electrolyte retention portion relative to the volume occupied by the negative electrode current collector, the ratio being 27%, and since the projection height was insufficient ((projection height/negative electrode film thickness)=1.8), the effect of electrolyte retention could not be sufficiently obtained. Therefore, for the electricity storage device (D-7), the obtained discharge capacity was slightly improved compared to the electricity storage device (D-6), but was lower compared to the electricity storage devices (D-1) to (D-4).

From the above, it was found that the volume ratio of the electrolyte retention portion was preferably 30% or higher, since charge/discharge characteristics of the electricity storage device improve.

Example 11

Except for using a positive electrode stacking body same as that of Example 3 in which the 1-conjugated polymer as above was used for the positive electrode active material, an electricity storage device (D-8) was fabricated in the same manner as the electricity storage device (D-1) of Example 10.

In addition, except for using a positive electrode stacking body same as that of Example 4 in which the radical polymer as above was used for the positive electrode active material, an electricity storage device (D-9) was fabricated in the same manner as the electricity storage device (D-1) of Example 10.

On the electricity storage devices (D-8) and (D-9), a charge/discharge capacity evaluation was performed. For the charge/discharge capacity evaluation, the charge/discharge current value, the upper charge voltage limit, and the lower discharge voltage limit were 4 mA, 4.2 V, and 2.75 V, respectively, and the charge rest time and the discharge rest time were 1 minute each. The charge rest time was the time after the end of charging until the start of next discharging. This charging/discharging was repeated 3 times, and the discharge capacity at the 3rd time was regarded as the charge/discharge capacity.

The obtained charge/discharge capacities of the electricity storage devices (D-8) and (D-9) were 0.14 mAh and 0.08 mAh, respectively, thereby being able to obtain high capacities in accordance with the design capacity. In each case, the volume ratio of the electrolyte retention portion relative to the volume occupied by the negative electrode current collector was high, being 55%, and thus, an electrolyte was able to be retained in the negative electrode current collector.

INDUSTRIAL APPLICABILITY

The electricity storage device of the present invention has high output, high capacity, and excellent repeated charge/discharge characteristics, and thus, can be suitably used: as a power supply for transport equipments, electrical and electronic equipments, and the like; an uninterruptible power supply; and the like. As examples of transport equipment, hybrid cars, and the like can be given. As examples of electrical and electronic equipments, mobile communications equipments, cellular phones, and the like can be given.

The invention claimed is:
1. An electricity storage device comprising:
a positive electrode current collector;
a positive electrode disposed on said positive electrode current collector, including a positive electrode active material capable of reversibly absorbing and desorbing at least anions;
a negative electrode current collector; and
a negative electrode disposed on said negative electrode current collector, comprising a negative electrode active material substantially capable of reversibly absorbing and desorbing lithium ions;
wherein:
said negative electrode active material is at least one selected from the group consisting of silicon, a silicon-containing alloy, a silicon compound, tin, a tin-containing alloy, and a tin compound;
lithium in an amount corresponding to an irreversible capacity of said negative electrode active material and corresponding to 20 to 95% of reversible capacity of said negative electrode active material is absorbed in said negative electrode, when said electricity storage device is in a completely discharged state; and said negative electrode is a thin film having a thickness of 10 μm or less.

2. The electricity storage device in accordance with claim 1, wherein the capacity of said negative electrode per unit area is 0.2 to 2.0 mAh/cm².

3. The electricity storage device in accordance with claim 1, wherein the thickness of said positive electrode is 5 or more times the thickness of said negative electrode.

4. The electricity storage device in accordance with claim 1, wherein the specific surface area of said negative electrode is 5 or larger, said specific surface area being a ratio of a surface area within the measurement range using a laser microscope to an apparent area within the measurement range, said apparent area being an area when the measurement range is assumed to be a flat surface.

5. The electricity storage device in accordance with claim 1, wherein the specific surface area of said negative electrode current collector is 5 or larger, said specific surface area being a ratio of a surface area within the measurement range using a laser microscope to an apparent area within the measurement range, said apparent area being an area when the measurement range is assumed to be a flat surface.

6. The electricity storage device in accordance with claim 1, wherein the surface roughness value Ra of said negative electrode current collector is equal to or greater than the thickness of said negative electrode.

7. The electricity storage device in accordance with claim 1, wherein absorption of lithium into said negative electrode active material is mechanically performed.

8. The electricity storage device in accordance with claim 1, wherein said negative electrode active material is silicon.

9. The electricity storage device in accordance with claim 1, wherein said negative electrode active material is a silicon nitride or a silicon oxynitride.

10. The electricity storage device in accordance with claim 1, wherein said silicon compound is a silicon oxide represented by a formula: SiOx (0≤x≤2).

11. The electricity storage device in accordance with claim 1, wherein said positive electrode active material is an activated carbon.

12. The electricity storage device in accordance with claim 1, wherein said positive electrode active material is an organic compound capable of being oxidized and reduced.

13. The electricity storage device in accordance with claim 12, wherein said organic compound has a radical in the molecule thereof.

14. The electricity storage device in accordance with claim 12, wherein said organic compound has a π-conjugated electron cloud in the molecule thereof.

15. The electricity storage device in accordance with claim 1, wherein said negative electrode current collector has an electrolyte retention portion, the volume of said electrolyte retention portion not being less than 30% of the volume occupied by said negative electrode current collector.

16. The electricity storage device in accordance with claim 1, wherein said negative electrode current collector has an electrolyte retention portion, the volume of said electrolyte retention portion not being less than 50% the volume occupied by said negative electrode current collector.

17. The electricity storage device in accordance with claim 1, wherein said negative electrode current collector is a microporous film having a plurality of through-holes that penetrate in the thickness direction thereof.

18. The electricity storage device in accordance with claim 1, wherein said negative electrode current collector: does not have through-holes that penetrate in the thickness direction thereof; and has a plurality of projections on the surface thereof, with the cross-section of said projection in the thickness direction thereof shaped as a trapezoid or a pseudo-trapezoid.

19. The electricity storage device in accordance with claim 18, wherein the height of said projection is 2 or more times the thickness of said negative electrode.

20. The electricity storage device in accordance with claim 18, wherein a cover layer including a negative electrode active material is formed on at least a part of the tip portion of said projection.

21. The electricity storage device in accordance with claim 1, wherein the electricity storage device is configured for use in a laptop personal computer.

22. The electricity storage device in accordance with claim 1, wherein the electricity storage device is configured for use in a hybrid car.

23. The electricity storage device in accordance with claim 1, wherein the electricity storage device is configured for use in a cellular phone.

* * * * *